(12) United States Patent
Smith et al.

(10) Patent No.: US 10,819,804 B2
(45) Date of Patent: Oct. 27, 2020

(54) EFFICIENT REQUEST-RESPONSE ROUTING OVER A DATA EXCHANGE LAYER

(71) Applicant: McAfee, LLC, Santa Clara, CA (US)

(72) Inventors: Christopher Smith, Sherwood, OR (US); Edward A. Farrenkopf, Sun Lakes, AZ (US)

(73) Assignee: McAfee, LLC, Santa Clara, CA (US)

( * ) Notice: Subject to any disclaimer, the term of this patent is extended or adjusted under 35 U.S.C. 154(b) by 213 days.

(21) Appl. No.: 14/912,913

(22) PCT Filed: Dec. 19, 2013

(86) PCT No.: PCT/US2013/076621
§ 371 (c)(1),
(2) Date: Feb. 18, 2016

(87) PCT Pub. No.: WO2015/047436
PCT Pub. Date: Apr. 2, 2015

(65) Prior Publication Data
US 2016/0219116 A1      Jul. 28, 2016

Related U.S. Application Data

(60) Provisional application No. 61/884,016, filed on Sep. 28, 2013, provisional application No. 61/884,013, filed on Sep. 28, 2013.

(51) Int. Cl.
*G06F 15/16* (2006.01)
*H04L 29/08* (2006.01)
*H04L 29/06* (2006.01)

(52) U.S. Cl.
CPC .......... *H04L 67/16* (2013.01); *H04L 67/2809* (2013.01); *H04L 67/2814* (2013.01); *H04L 67/42* (2013.01)

(58) Field of Classification Search
CPC ..... H04L 67/16; H04L 67/42; H04L 67/2809; H04L 67/2814
(Continued)

(56) References Cited

U.S. PATENT DOCUMENTS 5,987,610 A    11/1999 Franczek et al.
6,073,142 A    6/2000 Geiger et al.
(Continued)

OTHER PUBLICATIONS

International Search Report and Written Opinion in International Application PCT/US2012/076621 dated Jun. 12, 2014.
(Continued)

*Primary Examiner* — Liang Che A Wang
*Assistant Examiner* — Johnny B Aguiar
(74) *Attorney, Agent, or Firm* — Patent Capital Group

(57) ABSTRACT

In an example, there is disclosed an efficient request/response routing over a publish/subscribe messaging framework. Upon receiving a request for a service, a DXL broker may identify zero or more DXL domain masters providing the service. If no DXL domain masters are available to provide the service, the DXL broker may send a response message, or publish a DXL message, indicating that the service is not available. If more than one DXL domain master provides the service, then the DXL broker may identify the best DXL domain master to service the request, and forward the request to that DXL domain master.

22 Claims, 19 Drawing Sheets

(58) Field of Classification Search
USPC ....... 709/203, 217, 219, 223, 238, 241, 244, 709/213
See application file for complete search history.

(56) References Cited

U.S. PATENT DOCUMENTS

| | | | |
|---|---|---|---|
| 6,460,050 B1 | 10/2002 | Pace et al. | |
| 7,506,155 B1 | 3/2009 | Stewart et al. | |
| 7,792,989 B2 | 9/2010 | Toebes et al. | |
| 2006/0116988 A1* | 6/2006 | Toebes | H04L 67/1021 |
| 2006/0126601 A1 | 6/2006 | Kim et al. | |
| 2007/0011126 A1* | 1/2007 | Conner | G06Q 10/00 706/47 |
| 2008/0069082 A1* | 3/2008 | Patrick | H04L 41/145 370/351 |
| 2008/0104258 A1* | 5/2008 | O'Neill | H04L 67/325 709/228 |
| 2010/0009704 A1 | 1/2010 | Fan et al. | |
| 2010/0017368 A1* | 1/2010 | Mao | G06F 9/465 707/E17.014 |
| 2010/0082737 A1* | 4/2010 | Dankle | G06F 9/546 709/203 |
| 2010/0205237 A1* | 8/2010 | El-Nakhily | G06F 9/5055 709/203 |
| 2011/0113105 A1* | 5/2011 | Eckardt | G06Q 10/10 709/206 |
| 2011/0125776 A1* | 5/2011 | Roshen | G06F 17/30887 707/769 |
| 2011/0196824 A1 | 8/2011 | Maes | |
| 2012/0042040 A1* | 2/2012 | Bailey | G06F 9/5055 709/217 |
| 2012/0059815 A1 | 3/2012 | Friedlander et al. | |
| 2015/0012661 A1* | 1/2015 | Elmore | H04L 65/4084 709/231 |

OTHER PUBLICATIONS

International Preliminary Report on Patentability and Written Opinion in International Application PCT/US2012/076621 dated Mar. 29, 2016.

\* cited by examiner

EFFICIENT REQUEST-RESPONSE ROUTING OVER A DATA EXCHANGE LAYER

CROSS-REFERENCE TO RELATED APPLICATIONS

This Application is a national stage of application under 35 U.S.C. § 371 of PCT International Application Serial No. PCT/US2013/076621, filed on Dec. 19, 2013 and entitled "Efficient Request-Response Routing Over A Data Exchange Layer", which application claims the benefit of priority to U.S. Provisional Application Ser. No. 61/884,013 filed on Sep. 28, 2013 and entitled "Efficient Request-Response Routing Over Messaging Framework," and also claims priority U.S. Provisional Application Ser. No. 61/884,016 filed on Sep. 28, 2013 and entitled "Dynamic Determination of Best Broker Based on Location". The disclosures of the prior applications are considered part of and are hereby incorporated by reference in their entirety in the disclosure application.

FIELD OF THE DISCLOSURE

This application relates to the field of enterprise security, and more particularly to an efficient request-response routing over a messaging framework.

BACKGROUND

An enterprise service bus (ESB) is a software-based network architecture that provides a medium of data exchange over a service-oriented architecture. In some embodiments, ESB is a special case of a client-server software architecture in which clients may route messages through the server.

Software, binaries, executables, advertising, web pages, documents, macros, executable objects, and other data provided to users (collectively "executable objects") may include security flaws and privacy leaks that are subject to exploitation by malware. As used throughout this specification, malicious software ("malware") may include a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. "Malware behavior" is defined as any behavior that qualifies an application as malware or grayware. Some prior art systems are configured to identify and block malware, for example by maintaining databases of known malware.

In addition to executable objects, computing devices may encounter static objects, which are not intended to change the operating state of a computer. As a class, executable objects and static objects may be referred to simply as "objects." An enterprise security concern is the classification of objects' malware status.

BRIEF DESCRIPTION OF THE DRAWINGS

The present disclosure is best understood from the following detailed description when read with the accompanying FIGUREs. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
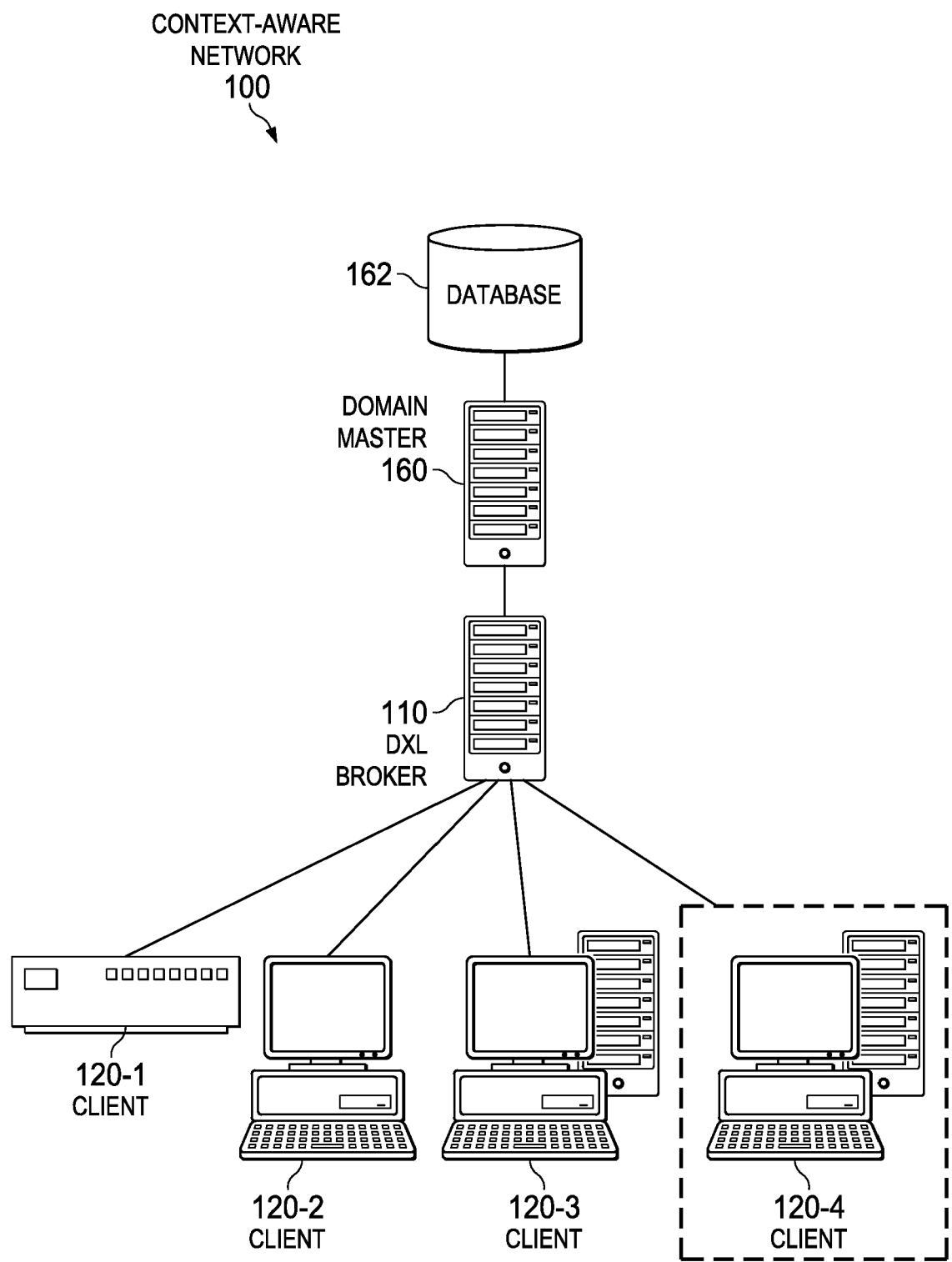
FIG. 1 is a network diagram of a context-aware network with DXL capability according to one or more examples of the present specification.

In an example, there is disclosed an efficient request/response routing over a publish/subscribe messaging framework. Upon receiving a request for a service, a data exchange layer (DXL) broker may identify zero or more DXL domain masters providing the service. If no DXL domain masters are available to provide the service, the DXL broker may send a response message, or publish a DXL message, indicating that the service is not available. If more than one DXL domain master provides the service, then the DXL broker may identify the best DXL domain master to service the request, and forward the request to that DXL domain master.

EXAMPLES OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In an increasingly heterogeneous software ecosystem, enterprises may face new and enhanced security challenges and malware threats. This creates a situation in which real-time exchange of threat intelligence between otherwise autonomous network elements is desirable. Increased sharing may improve security between devices that otherwise operate in their own security "silos."

The system and method of the present specification addresses such challenges by providing standardized data representations across data sources, and safeguarding the quality of data shared by disparate sources.

Context-Aware Computing (CAC) is a style of computing in which situational and environmental information about people, places and things is used to anticipate immediate needs and proactively offer enriched, situation-aware, and usable functions and experiences. Context-aware computing relies on capturing data about the world as it is at the moment the system is running.

According to one or more examples of the present specification, a "context-aware network" is an adaptive system, including for example a security system, of interconnected services that communicate and share information to make real-time, accurate decisions by individual products and/or as a collective. According to an example, network, endpoint, database, application and other security solutions are no longer to operate as separate "silos" but as one synchronized, real-time, context-aware and adaptive, security system.

In an example, multiple network elements are connected to one another via a data exchange layer (DXL), which is a type of ESB that is suitable for exchange of security-related messages among other things. As used herein, "network elements" include any type of client or server (e.g., a video server, a web server, etc.), routers, switches, gateways, bridges, load-balancers, firewalls, inline service nodes, proxies, network appliances, processors, modules, or any other suitable device, component, element, or object operable to exchange information in a network environment. More specifically, DXL endpoints are network elements that interact over a DXL ESB. DXL endpoints may be distributed across a customer network and communicate in "real-time" in a trusted, secure, and reliable fashion. This may provide increased automation and improved security services.

In an example, DXL endpoints are deployed at strategic locations within a network to intercept ongoing business activity, inspect and interpret it, and ultimately determine whether it is authorized, meaning for example that it is consistent with enterprise security policies. In some cases, network elements make such decisions "in-band," momentarily suspending the business activity, and in "machine-real-time," at latencies low enough to avoid a significant user-perceptible delay in the business activity.

In some cases, network elements may have independent access to security data only by way of their own independent analysis and observation, and via scheduled definition updates, which may come, for example, on a weekly basis as updated malware definition.

Because network elements are often heterogeneous and may be deployed, particularly in a modern network, in a temporary or ad hoc fashion, real-time intelligence becomes a challenge, particularly when "in-band" decisions are necessary. Furthermore, an enterprise may procure security solutions in a piecemeal fashion, so that one product cannot always assume the presence of another product. For example, there may not be a single, pre-defined repository of threat intelligence for network elements to consult, and regular malware definition updates may not include lately discovered threats. Representation and interpretation of data offer yet another challenge. Network elements may use disparate, proprietary data representations. Thus, for example, even an antivirus scanner may not be configured to share newly-discovered malware information with a network-based security device. Trustworthiness of information may be yet another challenge in other contexts. In other words, even if an antivirus scanner and network-based security device are configured to share security intelligence, each may not have a means of validating intelligence received from the other.

In an example, the present specification provides a data exchange layer (DXL), which may operate on a lightweight messaging-based communications infrastructure such as ESB and be configured to allow endpoints to share contextual data. DXL may be one element of a larger security-connected framework, which is an adaptive system, such as a security system, of interconnected services that communicate and share information to make real-time, accurate security decisions by individual security products and/or as a collective. According to an example, network, endpoint, database, application and other security solutions need not operate as separate 'silos' but as one synchronized, real-time, context-aware and adaptive security system.

In an example of a security-connected framework, a real-time, bi-directional communications fabric is provided for enabling real-time security management. Specifically, certain existing messaging infrastructures are based on one-to-many communications (publish-subscribe). The publish-subscribe capabilities may be significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

A DXL domain master may combine and reconcile the client properties received from a plurality of sources into a single record of truth according to a common information model (CIM), containing a single value or values. This may include determining that a first data source is more trusted than a second data source, and using the data from the first data source, or otherwise reconciling a plurality of data into a single record.

The reconciled data may be stored in a domain database, and a domain master may publish the client properties on the DXL. A DXL broker may then forward the published message to DXL endpoints, which receives a singular and most accurate reconciled value. Subsequently, a client may send a DXL request over the DXL, inquiring about the properties of a DXL client. The DXL broker receives this request and automatically routes it to a domain master. The domain master retrieves the client properties from its domain database and sends a DXL response message, which the DXL broker receives and forwards to the DXL client. Note that while the "publish-subscribe" transactions in this example are one-to-many, one-to-one "request-response" transactions are natively provided on the same fabric.

Further adding to extensibility, new or better data sources may be incorporated, by integrating them with domain master 160. This may be completely transparent to clients 120 and other DXL endpoints.

Additional features of a DXL broker may include, by way of non-limiting example: service and location registries to lookup registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain masters need not be concerned with how each DXL endpoint treats a published message. Rather, that can be a matter of enterprise security policy.

Figure 2:
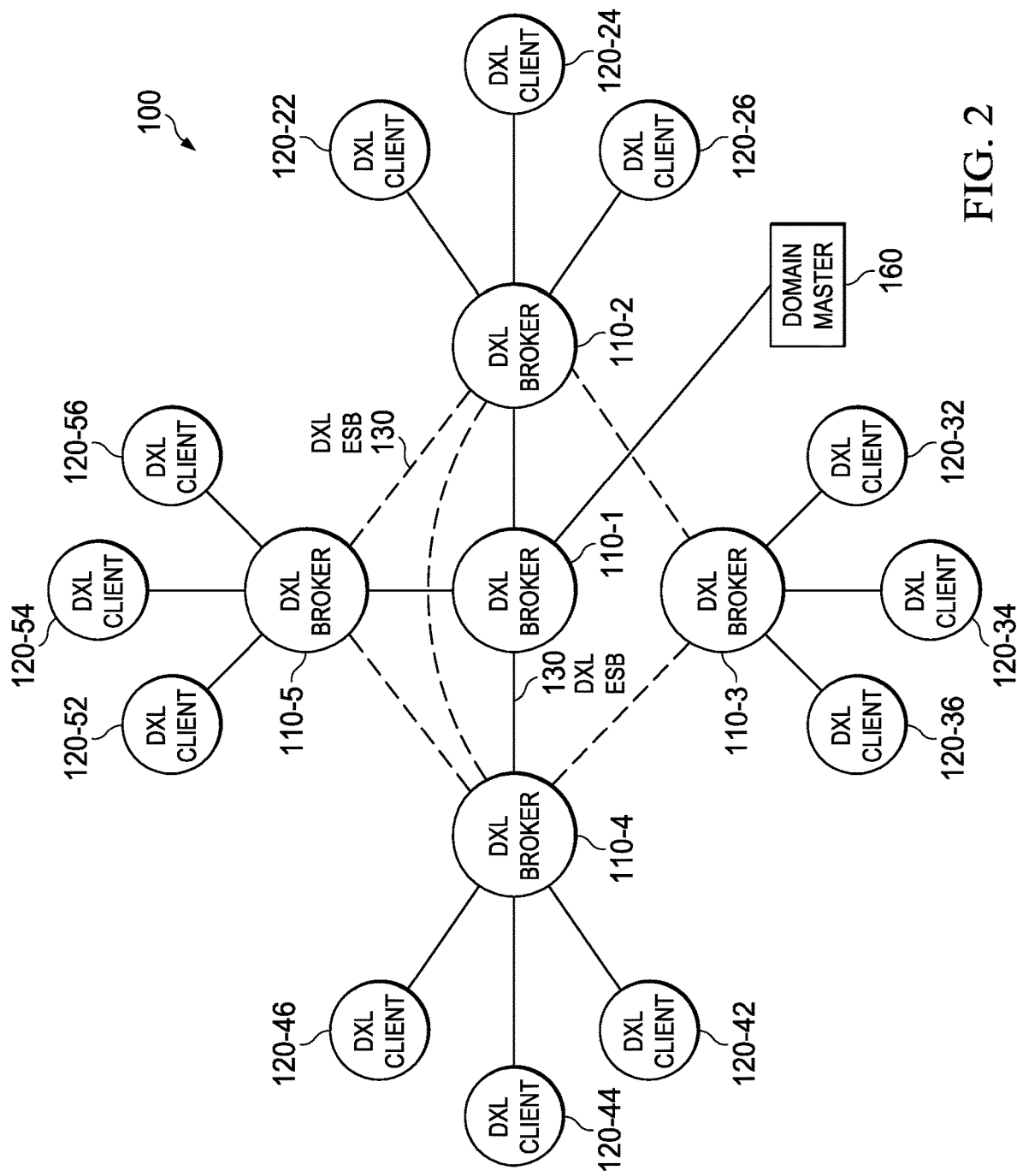
FIG. 2 is a network diagram disclosing a distributed architecture according to one or more examples of the present specification.

FIG. 1 is a network diagram of a context-aware network 100 with DXL capability. According to this example, a plurality of clients 120 is connected to a DXL enterprise service bus (ESB) 130 (FIG. 2). DXL ESB 130 is an example of a DXL fabric, and may be provided on top of an existing network, such as a local area network (LAN). Client 120 may be any suitable computing device, including by way of non-limiting example a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within a communication system, including a suitable interface to an end user, such as a microphone, a display, or a keyboard or other terminal equipment. In the example of FIG. 1, client 120-1 is an embedded device, such as a network security sensor. Client 120-2 is a virtual machine. Client 120-3 is a laptop or notebook computer. Client 120-4 is a desktop computer.

DXL ESB 130 may be any type of physical or virtual network connection over which appropriate data may pass. At present, there is no fixed or global standard for an ESB, and the term, as used herein, is intended broadly to encompass any network technology or topology suitable for message exchange. In one embodiment, message queuing telemetry transport (MQTT) messages are exchanged on port 8883. In some cases, clients 120, DXL broker 110, domain master 160, database 162, JTI server (FIG. 1A), proxy 170 (FIG. 1A), and threat intelligence service 180 (FIG. 1A), all by way of non-limiting example, may be referred to as "network elements."

Network elements configured to operate on or with DXL ESB 130 may be referred to as "DXL endpoints." These may include, in an example, clients 120, DXL broker 110, and domain master 160.

DXL broker 110 may be configured to provide DXL messaging services over DXL ESB 130, such as maintaining DXL routing tables and delivering messages.

DXL broker 110 provides DXL services, which in an example are network services operable to provide DXL ESB 130 to DXL endpoints.

Domain master 160 may be configured to communicatively couple to DXL broker 130. Domain master 160 may maintain domain data in a database such as database 162. In this example, domain master 160 and database 162 are shown as two distinct entities, but it should be noted that many configurations are possible. For example, database 162 may reside on a disk drive local to the domain master 160, or may be separately or remotely hosted. Database 162 is disclosed by way of example, and may be any suitable data store, including a structured or relational database, distributed database, or flat file by way of non-limiting example.

By way of operative example, a client such as laptop 120-3 connects to the LAN and receives a new IP address. At this point, several properties of laptop 120-3 become knowable to other network elements, including, by way of non-limiting example, its IP address, information about its operating system, and the logged-on user's username. For ease of reference, these are referred to as "client properties" throughout this example. Client properties are embodiments of security-intelligence data, and are of interest to virtual machine 120-2, which has previously subscribed the security-intelligence data topic with domain master 160.

Client properties may be reported to the DXL simultaneously by two distinct sources, namely by laptop 120-3, and by network security sensor 120-1. However, network security sensor 120-1 may fail to report a username value. It may also report an OS value different from that reported by the laptop 120-3. This may be, for example, because network security sensor 120-1 is sensing data remotely, and may not be able to determine these values as reliably as laptop 120-3 itself.

Domain master 160 is responsible for the "client system" data domain, which includes client properties. When laptop 120-3 and client 120-1 publish a message containing the client properties, both messages are first routed to DXL broker 110. DXL broker 110 may then forward the client properties to domain master 160.

Domain master 160 may combine and reconcile the client properties received from the two sources into a single record of truth, containing a single value for IP address, operating system, and username respectively. Specifically, it may determine via its own logic and perhaps prior configuration that laptop 120-3 is trusted more for OS value than network security sensor 120-1. Therefore, domain master 160 may ignore the "operating system" value received from network security sensor 120-1 when it conflicts with laptop 120-3.

The reconciled client properties are persistently stored in domain database 162. Domain master 160 may then publish the client properties on DXL ESB 130. DXL broker 110 may then forward the published message to virtual machine 120-2, which receives a singular and most accurate value for client properties.

Subsequently, client 120-4 may send a DXL request over DXL ESB 130, inquiring about the client properties for laptop 120-3. DXL broker 110 receives this request and automatically routes it to domain master 160. Domain master 160 retrieves the client properties from domain database 162 and sends a DXL response message, which DXL broker 110 receives and forwards to client 120-4. Note that while the "publish-subscribe" transactions in this example are one-to-many, the "request-response" transactions are one-to-one.

In some embodiments, DXL may be characterized by messaging that allows loose integration or coupling of multiple network elements. Loose coupling may reduce the assumptions each DXL endpoint must make about other DXL endpoints, such as the presence of certain capabilities, hardware, or software. According to one or more examples of the present specification, DXL is a 'Plug-and-Play' API, and may facilitate context-aware and adaptive security by enabling context to be shared between products.

Further according to one or more examples of the present specification, DXL is an elastic architecture with multiple deployment options and is highly scalable. DXL may also be designed with openness in mind and enable third-party integration.

DXL ESB 130 may be based on a two-layer protocol. The "bottom" layer is a secure, reliable, low-latency data transport fabric that connects diverse security elements as a mesh, or in a hub-and-spoke configuration. The "top" layer is an extensible data exchange framework that is configured to facilitate trustworthy data representation.

In an example, DXL endpoints connect to DXL ESB 130. Each DXL endpoint is assigned a distinct identity, and authenticates itself to DXL ESB 130 upon startup, for example via a certificate or other secure token. DXL endpoints may establish one-to-one communications via DXL ESB 130, for example by sending a DXL message addressed to a DXL endpoint with a specific identity. This enables DXL endpoints to communicate with each other without having to establish a point-to-point network connection. In an example, this is analogous to a person-to-person phone call.

In another example, DXL may provide a publish-subscribe framework in which certain DXL endpoints "subscribe" to messages of a certain type. When a DXL endpoint "publishes" a message of that type on DXL ESB 130, all subscribers may process the message, while non-subscribers may safely ignore it. In an example, this is analogous to a podcast subscription service. In yet another example, DXL may provide a request-response framework. In this case, one DXL endpoint may publish a request over DXL ESB 130. An appropriate DXL endpoint receiving the request may provide a response. Advantageously, the response may be used by more than just the DXL endpoint that originally published the request. For example, if a client 120 publishes a request for an object's reputation, JTI server 150 may respond by publishing the reputation. Thus, other clients 120 that find instances of the object may benefit from the response. For example, clients 120 may maintain a comprehensive cache of reputations published on the network. If a client 120 then newly encounters an object that is known on the network, client 120 already has an up-to-date reputation for the object.

DXL ESB 130 may be implemented using diverse software elements, patterns, and constructs suited to the specific infrastructure connecting the security elements. For instance, in a physical enterprise network, messaging middleware consisting of multiple interconnected message brokers may be deployed, where endpoints connect to the closest broker. In a virtual network infrastructure, the fabric may leverage hypervisor provided channels.

As noted above, DXL ESB 130 may be configured to provide real-time, trusted exchange of data among otherwise-autonomous, dynamically-assembled DXL endpoints. Thus, in an example DXL ESB 130's conceptual framework may comprise two virtual components:

a. Broad collections of security-relevant data are categorized into "data domains." Each data domain is a closely related sub-collection of entities, attributes, and inter-relationships.
  b. Domain master 160 is a data provider assigned ownership of data for each domain. Domain master 160 acts as an intermediate trusted data broker between firsthand sources of raw "intelligence" data, and data consumer endpoints such as clients 120. Intelligence data may flow from data producer endpoints to the appropriate domain master 160, and then be relayed to data consumer endpoints such as clients 120. Note that in this example, the concepts of "data producer" and "data consumer" are contextual roles, and not necessarily physical devices. A client 120 may be a data producer in one context and a data consumer in another context.

In an example, domain master 160 may establish firsthand trust relationships with data-provider endpoints. This enables it to gauge the quality (including accuracy and reliability) of data (such as reputation data) it receives from any particular source. When duplicate, piecemeal data is received from multiple (independent) sources, such as different clients 120, domain master 160 may reconcile the data and resolve conflicts to derive a single best-known record of truth (such as, for example, a reputation) for each object. This ensures that clients 120 receive consistent data.

Domain master 160 may also transform data into a well-understood, standardized representation. This representation may be published on DXL ESB 130, so that all clients 120 receive usable data.

Advantageously, DXL endpoints do not need to know what device originated data, or make point-to-point connections to other DXL endpoints, even when one-to-one communication is necessary. Rather, DXL client software or DXL extensions enable a DXL endpoint to use its own local APIs for querying and receiving data. To increase network efficiency, DXL endpoints may cache received data locally, which data may be trusted until it is superseded by an authorized DXL message. For example, clients 120 may subscribe to published reputations for objects. When an object reputation is received, either in response to a request-response transaction, or in a publish-subscribe model, client 120 may store the reputation in a local database. The reputation may be trusted until superseded, because DXL master 160 is configured to publish a reputation update whenever it receives an updated reputation. Thus, frequent individual data requests from clients 120 become bulk data subscriptions, as published reputations are available to all clients 120 that subscribe to reputations. Advantageously, this may reduce the latency of data exchanges.

In yet another example, DXL broker 110 provides a discovery and location service that informs DXL endpoints of the specific domain master 160 to which data query and subscription requests should be routed.

Advantageously, the example DXL architecture described herein is flexible. For example, individual data sources may connect and disconnect from the network without affecting data consumers. Domain master 160 may simply rely on whatever data sources are available. Furthermore, the framework makes no assumptions about the physical location or specifically how domain master 160 or domain endpoints are deployed or configured. So long as each network element provides valid DXL messaging, traffic is routed correctly.

In the example above, DXL master 160 is a logical singleton, but it should be noted that DXL master 160 may be implemented, for example, as a set of distributed service components, where each component services either a subset of the domain, or provides a local data replica of a service running elsewhere. Such configurations may enhance scale, performance, and reliability. This may also allow services to be transparently relocated.

Further advantageously, the DXL framework provided herein is extensible. For example, data about new entities and relationships may be provided simply by creating new data domains. New attributes and relationships for existing data domains may be provided simply by defining new message types for that domain.

In an example, domain master 160 has responsibility over the domain of malware data. To distinguish messages from the "malware" domain, such as network status and device maintenance, a namespace may be defined for each. For example, the reputation domain may use the "MALWARE" namespace, the network status domain may use the "STATUS" namespace, and the device maintenance domain may use the "MAINT" namespace. Thus, if domain master 160 is the master for the reputation domain, it knows to process messages within the malware namespace, and to ignore all others. This allows a designer for each domain to assign a set of messages without having to consult existing domains to avoid name collisions for messages.

For example, both the reputation domain and a device maintenance domain may have use for a message such as DOWNLOAD_UPDATES. In the case of the reputation domain, this message may be an instruction to retrieve updated malware definitions from JTI server 150. In the device maintenance domain, this may be an instruction to download operating system updates from a vendor.

Clients 120 may be configured to exchange data from several DXL domains and may subscribe to messages on both the reputation domain and the device maintenance domain. Thus, client 120-1 for example, may parse and respond to a DXL message DOWNLOAD_UPDATES by requesting bulk reputation updates. In one embodiment, the message requesting malware updates may itself be a DXL message. In some cases, for example where the updates are large and are not needed in real-time, delivery of the updates may be completed outside of the DXL architecture to reserve a DXL for lightweight, high-speed messaging.

Client 120 may also know that it should parse and respond to MAINT: DOWNLOAD_UPDATES by contacting a vendor's servers and requesting updates.

In the case where domain master 160 is configured as the master for the reputation domain, it may know to ignore all DXL messages that are not in the MALWARE namespace. Note, however that a single physical device may be configured to act as a domain master for multiple domains, in which case traffic in different namespaces may be passed to different subroutines. In some embodiments, DXL broker 110 may be configured to synthesize reports from a plurality of DXL network devices such as clients 120 that are given lesser privileges, such as "suggest" privileges on DXL ESB 130.

Further adding to extensibility, new or better data sources may be incorporated, by integrating them with domain master 160. This may be completely transparent to clients 120 and other DXL endpoints.

Additional features of a DXL broker 110 may include, by way of non-limiting example: service and location registries to look up registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain master 160 need not be concerned with how each DXL endpoint treats a published message. Rather, that can be a matter of enterprise security policy.

Additional DXL features for clients 120 may include, by way of non-limiting example: local message bus integration with an API to discover brokers, authenticate to DXL, and send and receive catalogued messages.

Additional general features of context-aware network 100 may include, by way of non-limiting example: DXL broker and client provisioning and management of domain master 160; policy-based authorization of endpoints onto DXL ESB 130; secure sockets layer (SSL)-based communications; proxy support for off-premises communications; and domain master appliances pre-configured with DXL broker functionality (thus joining domain master 160 and DXL broker 110 into one device).

Figure 1A:
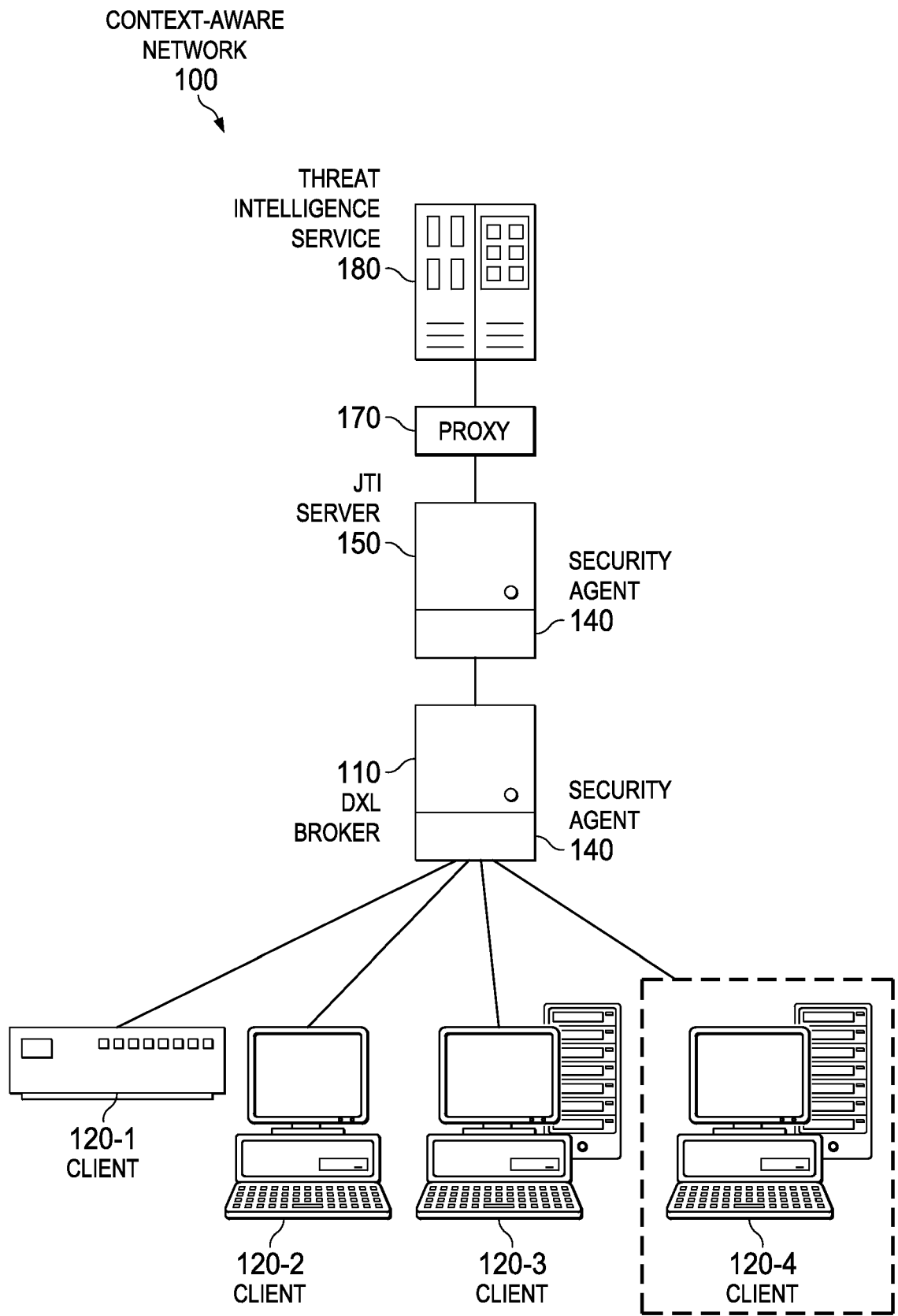
FIG. 1A is an example where a domain master is a joint threat intelligence (JTI) server according to one or more examples of the present specification.

FIG. 1A is an example where domain master 160 is a joint threat intelligence (JTI) server 150, providing for example, object reputation services on the "reputation" domain according to one or more examples of the present specification. JTI server 150 may communicatively couple to DXL broker 110. JTI server 150 may be a middleware appliance configured to provide reputation services, maintain metadata about network objects (such as reputation, prevalence, and intelligence, by way of non-limiting example), call out to external scanners for an object's reputation classification, and provide telemetry data to threat intelligence service 180. JTI server 150 may communicate with a global threat intelligence service 180 via a proxy 170, which may include either communication over DXL ESB 130, or over a more traditional IP network.

Advantageously, JTI server 150, in connection with threat intelligence service 180, may provide crowd-sourced object reputations. JTI server 150 may also provide administrator overrides. These may include aggregation of administrator override policies, from several enterprises, for whether an object should be run on a network and whether a certificate is considered "clean." These may also include client-side results, such as an aggregate of end-user decisions of whether to allow or block an object.

In another example, JTI server 150 may track prevalence data, including the prevalence of an object on context-aware network 100.

In yet another example, JTI server 150 may serve as a telemetry aggregator/proxy to gather and send to threat intelligence service 180 telemetry from endpoints that do not directly interact with threat intelligence service 180. JTI server 150 may also contribute file metadata to threat intelligence service 180, such as hashes, digital signature data, and file attributes.

JTI server 150 may receive several such messages from different clients 120, and in some cases, the messages may conflict with one another. Upon receiving an initial report from a client 120 identifying an object as malware, domain master 160 may publish a warning that the other clients should give additional scrutiny to the object, such as deep scanning or requesting user verification before executing the object. In other embodiments, domain master 160 may provide such information in response to a request for an object reputation from a client 120.

If additional clients 120 identify the object as malware, then a confidence indicator may pass a threshold. JTI server 150 may then publish a higher-level, such as command-level, message identifying the object as malware. If JTI server 150 receives multiple conflicting reports from different clients, a synthesis algorithm may provide an appropriate action. For example, if one or a few clients are found to be outliers, reporting a status different from a large majority of other clients, the outliers may be discarded. This synthesis algorithm may also account for specific clients' past reputations for accurate reporting, or for a reputation assigned based on installed hardware or software.

In an example where domain master 160 is a JTI server 150, this example illustrates the value of designating a hierarchy or other schema for assigning DXL endpoint privileges. For example, with respect to designating an object as malware, clients 120 may have "suggest" privileges. This may mean, for example, that clients 120 may identify an object that they believe to be malware, and may either direct a specific message to JTI server 150, or may publish a general message identifying the object as malware. Because clients have only "suggest" privileges on DXL ESB 130, other DXL endpoints that subscribe to reputation updates may treat the identification as less authoritative than an identification from a DXL network element with elevated privileges such as "assign" privileges. Privileges, and especially elevated privileges such as "assign" privileges, may be authenticated by a secure certificate provided as part of a DXL message.

Figure 1B:
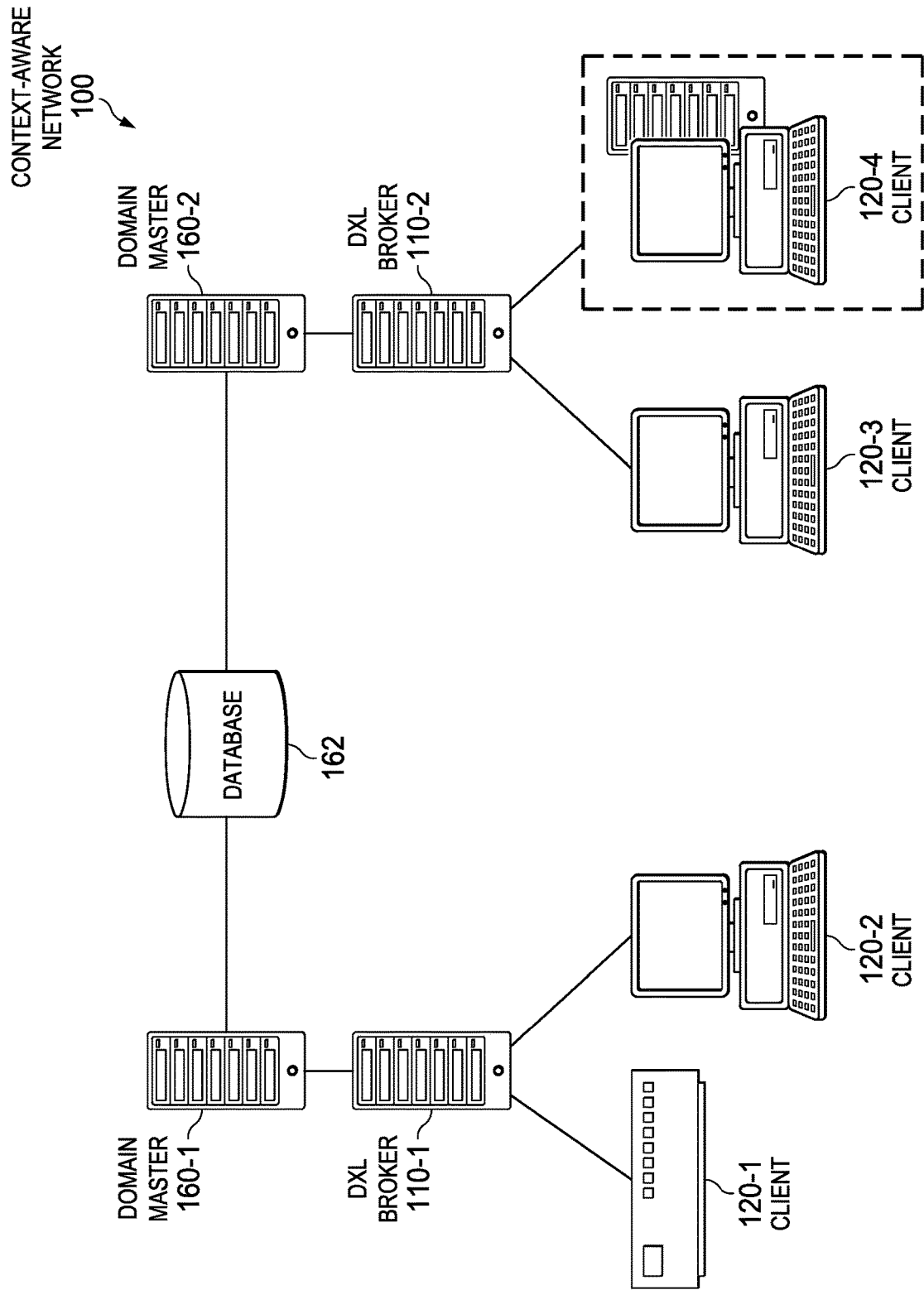
FIG. 1B is a network diagram of select elements in a context-aware network according to one or more examples of the present specification.

FIG. 1B is a network diagram of select elements in a context-aware network 100 according to one or more examples of the present specification. As seen in FIG. 1B, an additional DXL broker 110-2 may be added to service endpoints 120-3 and 120-4. DXL broker 110-2 may communicate with a second domain master 160-2, which may share domain database 162 with domain master 160-1.

FIG. 2 is a network diagram disclosing a distributed architecture according to one or more examples of the present specification. In this example, DXL broker 110-1 may be designated as the "hub," while DXL brokers 110-2, 110-3, 110-4, and 110-5 may be designated as "spokes." In an example, all DXL traffic that passes through a spoke will be forwarded to the hub, which will distribute the traffic to other spokes. Designation of a DXL broker 110 as the hub may be accomplished via any suitable means, such as selecting the hub based on MAC ID, IP address, or network proximity to domain master 160.

If DXL broker 110-1 goes offline, another hub may be at least temporarily needed. In that case, another hub may be elected. When DXL broker 110-1 comes back online, it may resume its duties as a hub, or may act as a spoke, depending on network topology and design considerations.

In another example, spokes may form a temporary mesh network upon connecting effectively to DXL broker 110-1. In yet other embodiments, DXL brokers 110 may be configured to operate full time in a mesh configuration.

Figure 3:
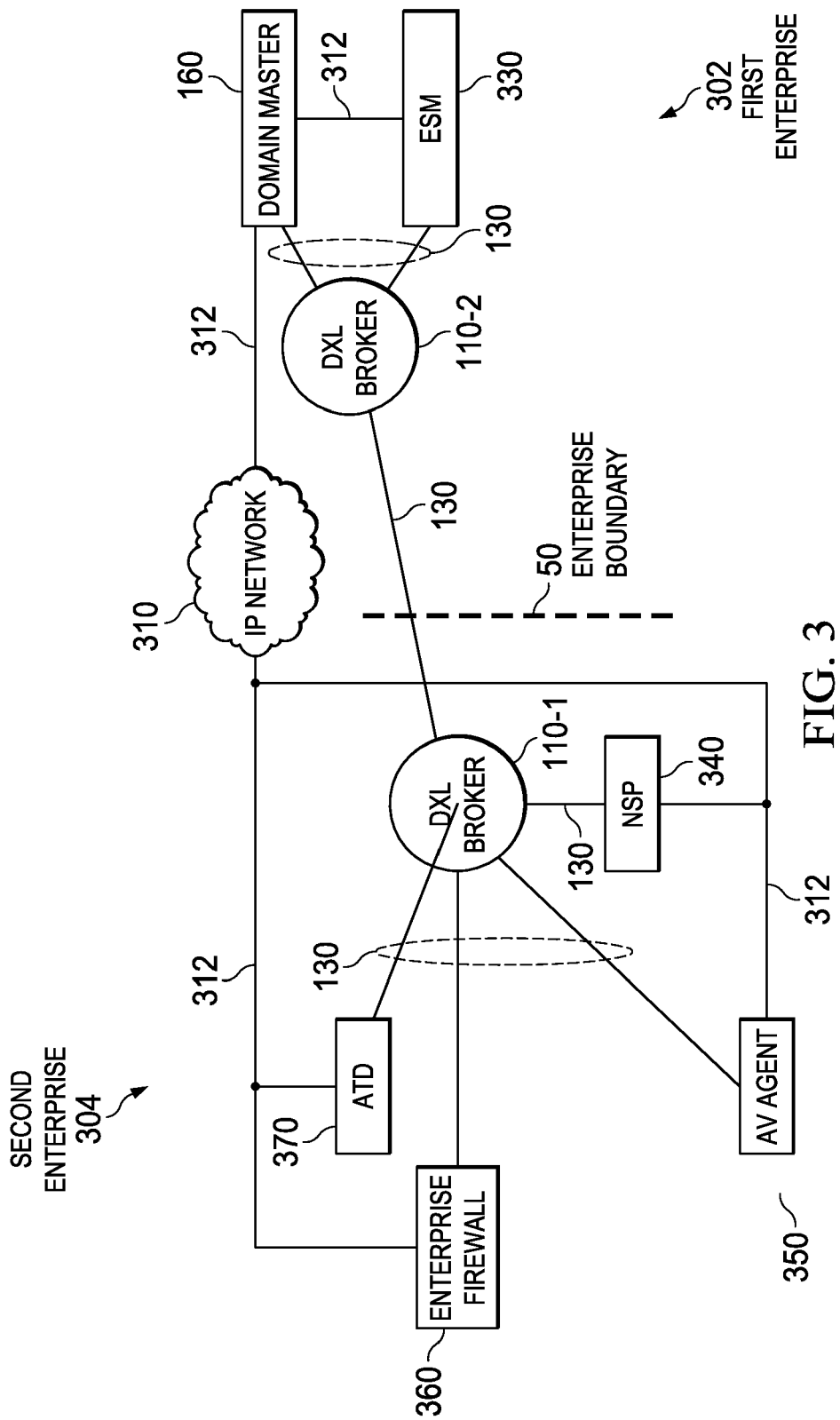
FIG. 3 is a network diagram of an example data exchange layer (DXL) network operating across a traditional enterprise boundary according to one or more examples of the present specification.

Additional extensibility may be provided by bridging DXL ESB 130 across disparate networks, enabling data to be exchanged over larger networks, including the Internet. FIG. 3 is a network diagram of an example DXL network operating across a traditional enterprise boundary according to one or more examples of the present specification. In this example, first enterprise 302 includes a DXL broker 110-2 which communicatively couples to a domain master 160 and enterprise switch master (ESM) 330. In one embodiment, domain master 160 and ESM 330 may be coupled over a traditional (non-DXL) network interface 312. Domain master 160 may connect to an IP Network 310. IP Network 310 may be any communicative platform operable to exchange data or information emanating from endpoints, including by way of non-limiting example, an Internet architecture providing end users with the ability to electronically interact, a plain old telephone system (POTS), which end users could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Second enterprise 304 also includes a DXL broker 110-1. DXL brokers 110 may communicate with each other over DXL ESB 130. In this example, DXL ESB 130 is physically provided by IP Network 310, but DXL traffic may be distinguished from other types of Internet traffic such as http and other user-centric network traffic, for example because it is provided on a different port or protocol.

DXL broker 110-1 may also be coupled, for example, to a network service provider (NSP) 340, antivirus agent 350, enterprise firewall 360, and advanced threat detection appliance (ATD) 370.

ATD 370 may be a dedicated appliance, or a general-purpose computing machine running advanced threat detection software. In one example, ATD 370 is configured to analyze objects without existing reputations and to assign those objects threat levels based on the analysis.

As this figure demonstrates, DXL ESB 130 may be used to integrate heterogeneous or otherwise unrelated network architectures, even across different enterprises. In an example, second enterprise 304 may be a third-party JTI service provider delivering ATD services to first enterprise 302.

Figure 4:
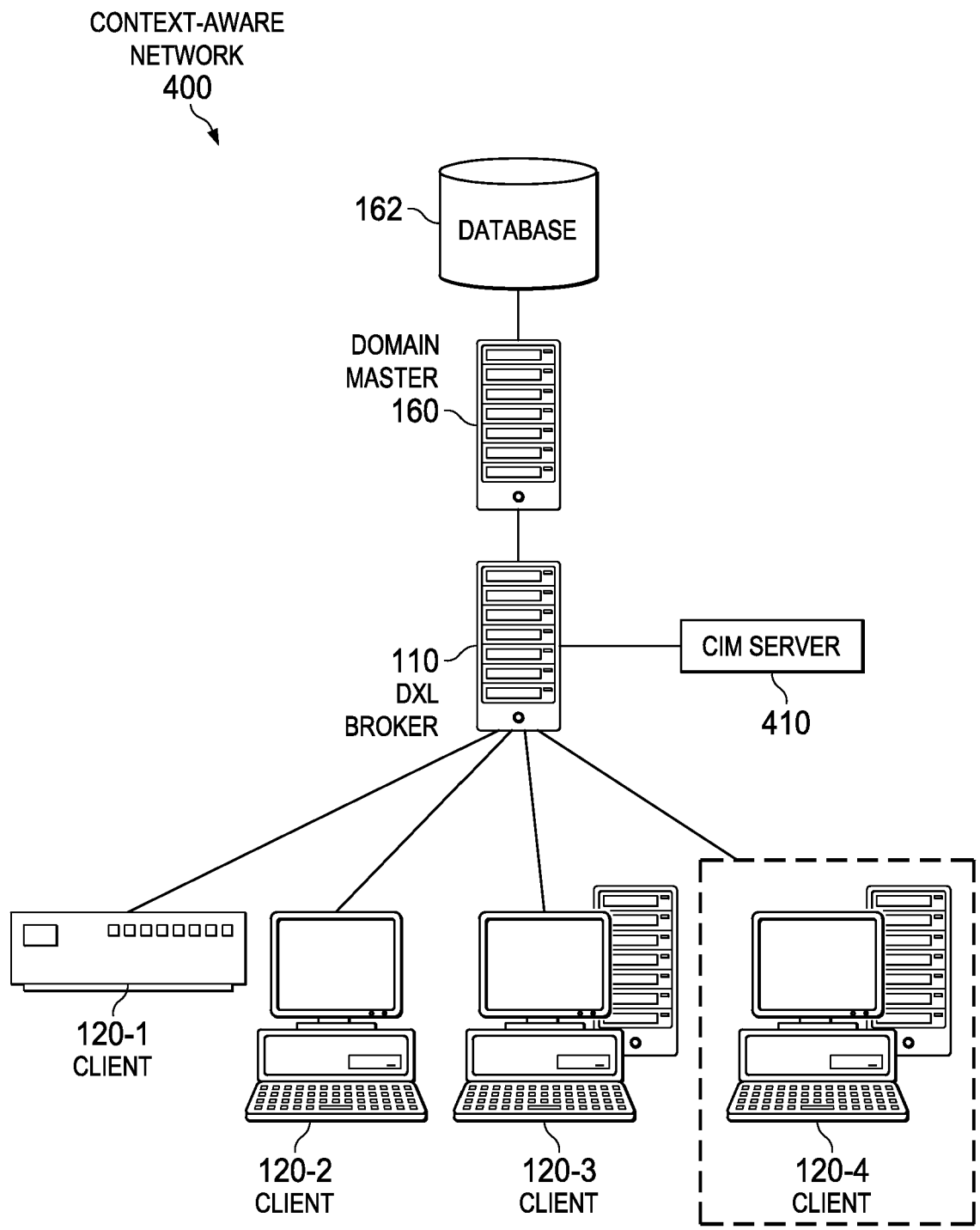
FIG. 4 is a network diagram of a context-aware network according to one or more examples of the present specification.

FIG. 4 is a network diagram of a context-aware network 400 according to one or more examples of the present specification. In an example, context-aware network 400 is substantially similar to context-aware network 100. However, in context-aware network 400 domain master 160 is a common information model (CIM) server 410.

According to one or more examples of the present specification, CIM is an open and extensible logical database schema designed to host different types of situational and environmental information. CIM may provide robust representation of new objects, building blocks, and data types. Core entities of CIM include, by way of non-limiting example, assets, identities, applications, and locations.

CIM may provide many-to-many relationships and building blocks that drive multiple use cases. CIM may also support advanced data visualization. Advantageously, according to one or more examples of the present specification, CIM scales massively and is open and extensible, allowing different product groups and third parties to develop new data extensions.

In an example of a CIM use case, a "location" represents a collection of network elements forming a logical location mapped into a physical location or a place. The location context can be used to, by way of non-limiting example, gather complete understanding with regards to the true scope and size of an organization (i.e. in the form of a network topology map).

CIM may also maintain the global authoritative state of situational and environmental information by synthesizing contextual information shared by multiple data sources over DXL ESB 130.

Figure 5:
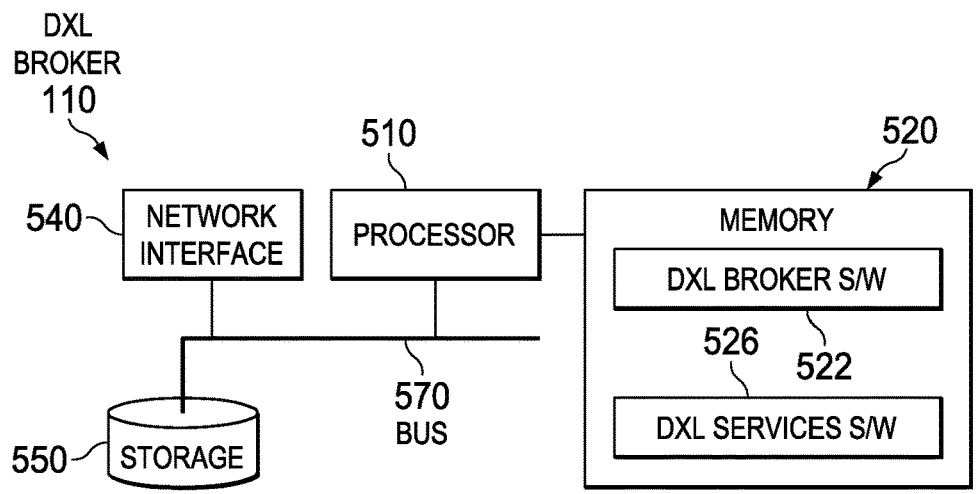
FIG. 5 is a block diagram of a DXL broker according to one or more examples of the present specification.

FIG. 5 is a block diagram of a DXL broker according to one or more examples of the present specification. In some embodiments, DXL broker 110, DXL services, and JTI server 150 may be provided in a single physical computing device.

In an example, DXL broker 110 is controlled by a processor 510. Processor 510 may connect to other system elements via system bus 570. Those other elements may include, by way of non-limiting example, a memory 520, network interface 540, and storage 550.

Processor 510 is configured to control DXL broker 110, for example via executable software or firmware instructions. A "processor" as used herein includes any combination of hardware, software, or firmware providing programmable logic, including by way of non-limiting example a microprocessor, digital signal processor, field-programmable gate array, programmable logic array, application-specific integrated circuit, or virtual machine processor.

Memory 520 may be a relatively low-latency volatile memory in some embodiments, and may include main memory, cache, on-chip memory, L1 memory, L2 memory, or similar. Note that in this embodiment, processor 510 is depicted in a direct memory access arrangement with memory 520, but in other embodiments, memory 520 may communicate with processor 510 via system bus 570, via some other bus, or via some other means. Furthermore, although memory 520 and storage 550 are depicted in this example as physically or conceptually separate devices, it should be appreciated that in some embodiments, memory 520 and storage 550 may share a physical device, which may or may not be divided into separate memory areas. Thus, it should be appreciated that the arrangement disclosed here is an example only, and not limiting. Rather, it is expressly intended that even where a memory and storage are spoken of separately, they may be embodied in a single physical or logical device unless expressly stated otherwise.

In this example, network interface 540 provides a physical and logical interface to DXL ESB 130, and includes any communication medium, whether analog, digital, or mixed-signal, that is configured to communicatively couple client 120 to other computing devices. Network interface 540 may include, by way of non-limiting example, a WiFi, Ethernet, Firewire, fiber optic, USB, serial interface, infrared, or cellular network, digital PCS network, 2G data network, 3G data network, 4G WiMAX, or 4G LTE data network. In some embodiments, network interface 540 may also provide a physical and logical interface to IP Network 310.

Storage 550 is disclosed as an example of a non-volatile memory medium, which may be a species of memory 520. In some embodiments, memory 520 and storage 550 may be separate devices, with memory 520 being a relatively low-latency volatile memory device, and storage 550 being a relatively high-latency non-volatile memory device. Storage 550 may also be another device, such as a hard drive, solid-state drive, external storage, redundant array of independent disks (RAID), network-attached storage, optical storage, tape drive, backup system, or any combination of the foregoing. Many other configurations are also possible, and are intended to be encompassed within the broad scope of this specification.

In an example, memory 520 includes DXL broker 522 and DXL services software 526. DXL broker softer 522 provides DXL broker services as described herein. DXL services software 526 may provide DXL client services or DXL broker 110. For example, DXL broker 110 may subscribe to certain types of messages in a client capacity.

Figure 6:
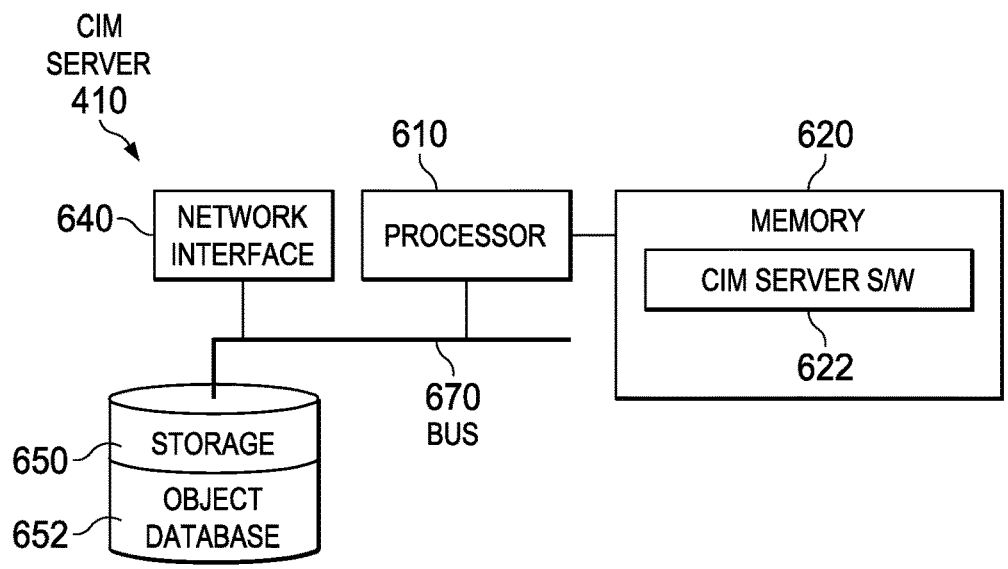
FIG. 6 is a block diagram of a common information model (CIM) server according to one or more examples of the present specification.

FIG. 6 is a block diagram of a CIM server 410 according to one or more examples of the present specification. In an example, CIM server 410 is controlled by a processor 610. Processor 610 may connect to other system elements via system bus 670. Those other elements may include, by way of non-limiting example, a memory 620, network interface 640, and storage 650. Reference is made to corresponding elements in FIG. 5, which contains additional details and definitions.

Memory 620 may include CIM server software 622. CIM server software 622 may be configured to provide CIM services as described herein.

Storage 650 may include a local object database 652. Object database 652 may contain stored information about objects on the network, including, for example, reputations and metadata.

Figure 7:
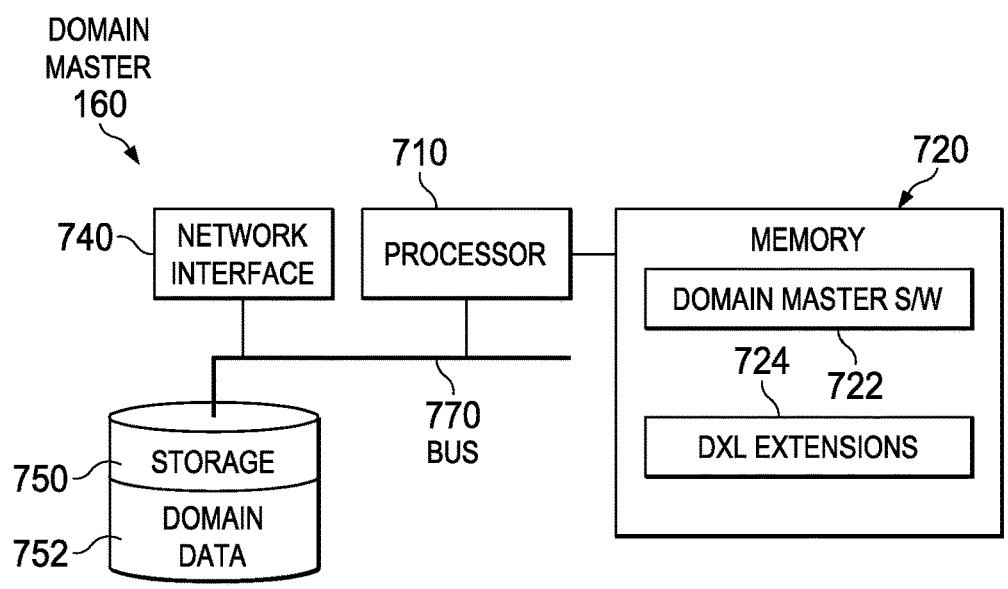
FIG. 7 is a block diagram of a domain master according to one or more examples of the present specification.

FIG. 7 is a block diagram of a domain master 160 according to one or more examples of the present specification. In an example, domain master 160 is controlled by a processor 710. Processor 710 may connect to other system elements via system bus 770. Those other elements may include, by way of non-limiting example, a memory 720, network interface 740, and storage 750. Reference is made to corresponding elements in FIG. 5, which contains additional details and definitions.

In an example, memory 720 includes domain master software 722 and DXL extension 724. Domain master software 722 may be configured to provide domain master services as described herein. DXL extensions 724 may provide server extensions that allow domain master 160 to operate on DXL ESB 130. In some embodiments, DXL extension 724 may include instructions that permit domain master 160 to act as a DXL client in some situations.

Figure 8:
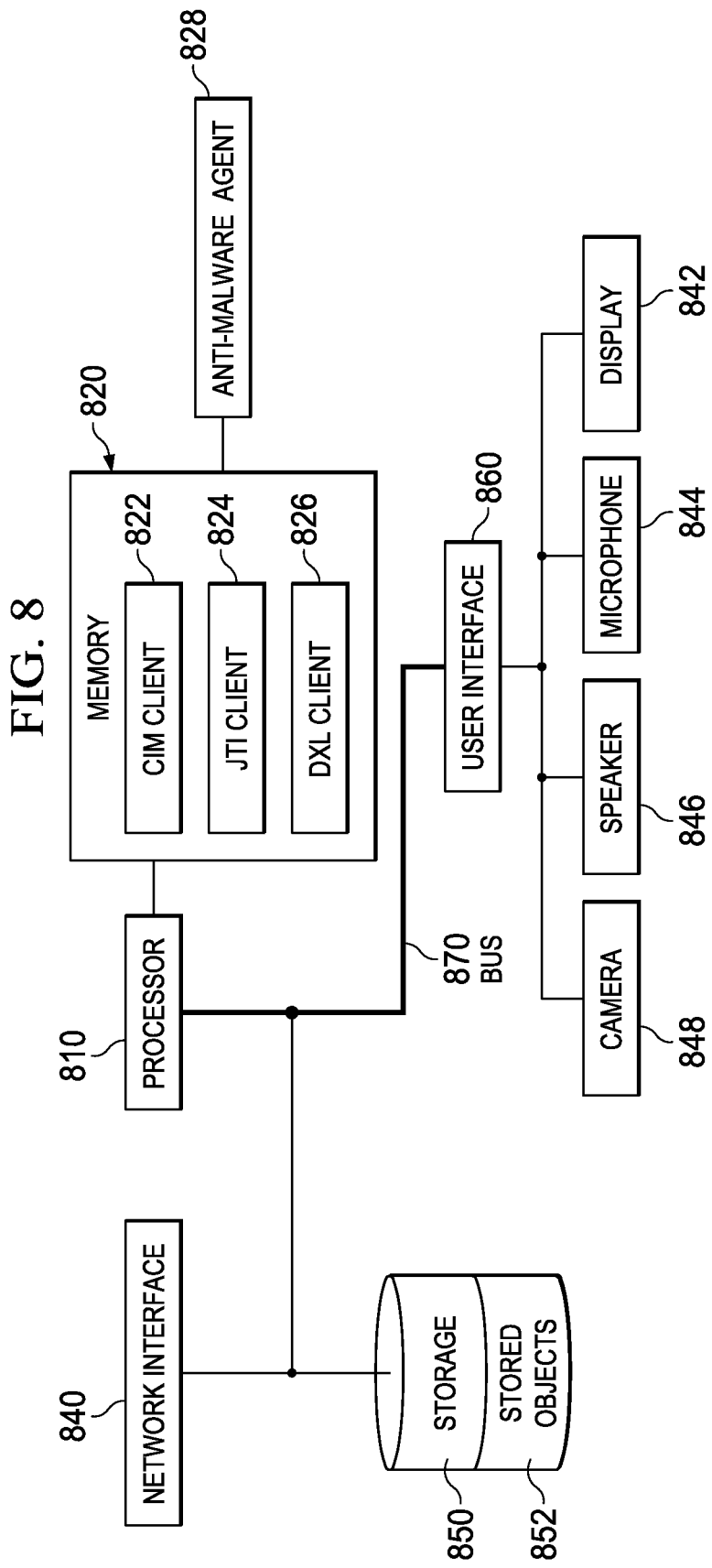
FIG. 8 is a block diagram of a client according to one or more examples of the present specification.

FIG. 8 is a block diagram of a client 120 according to one or more examples of the present specification. Client 120 is controlled by a processor 810, which is communicatively coupled to a memory element 820. In an example, processor 810 is communicatively coupled to other system elements via bus 870. Those elements may include, by way of non-limiting example, a network interface 840, storage 850, which in some cases may be a species of memory element 820, and a user interface 860. It is expressly intended that any of the above elements can be realized in hardware, software, firmware, or any combination thereof.

In some embodiments, a user interface 860 may be provided to aid a user in interacting with client 120. A "user interface" includes any combination of hardware, software, and firmware configured to enable a user to interact with client 120, whether or not in real-time. In the example, user interface 360 may include, by way of non-limiting example, a keyboard (not shown), mouse (not shown), display monitor 842, speaker 846, microphone 844, touch-sensitive display, which may act as a combined input/output device, and which may be a species of display 842, and a camera 848. User interface 860 may include software services such as a graphical user interface, including real-time dialog boxes that solicit input or confirmation from a user.

In an example, memory 820 has stored therein executable instructions operable to provide software services, which may be contained in several distinct modules. A DXL client 826 may provide software services for interacting with DXL ESB 130, and may include, for example, certificates authenticating client 120 on DXL ESB 130, subroutines for publishing messages, and subroutines for parsing subscribed incoming messages. CIM client 822 may provide CIM services as described with more particularity in relation to FIG. 4. CIM client 822 may also maintain a comprehensive catalog of stored objects 852, including for example a comprehensive catalog of installed applications. JTI client 824 may provide JTI client services, such as local reputation management and interactions with JTI server 150. Client 120 may also have a separate antimalware agent 828, which may provide antivirus and other antimalware services. In some cases, antimalware agent 828 is integrated with JTI client 824.

Figure 9:
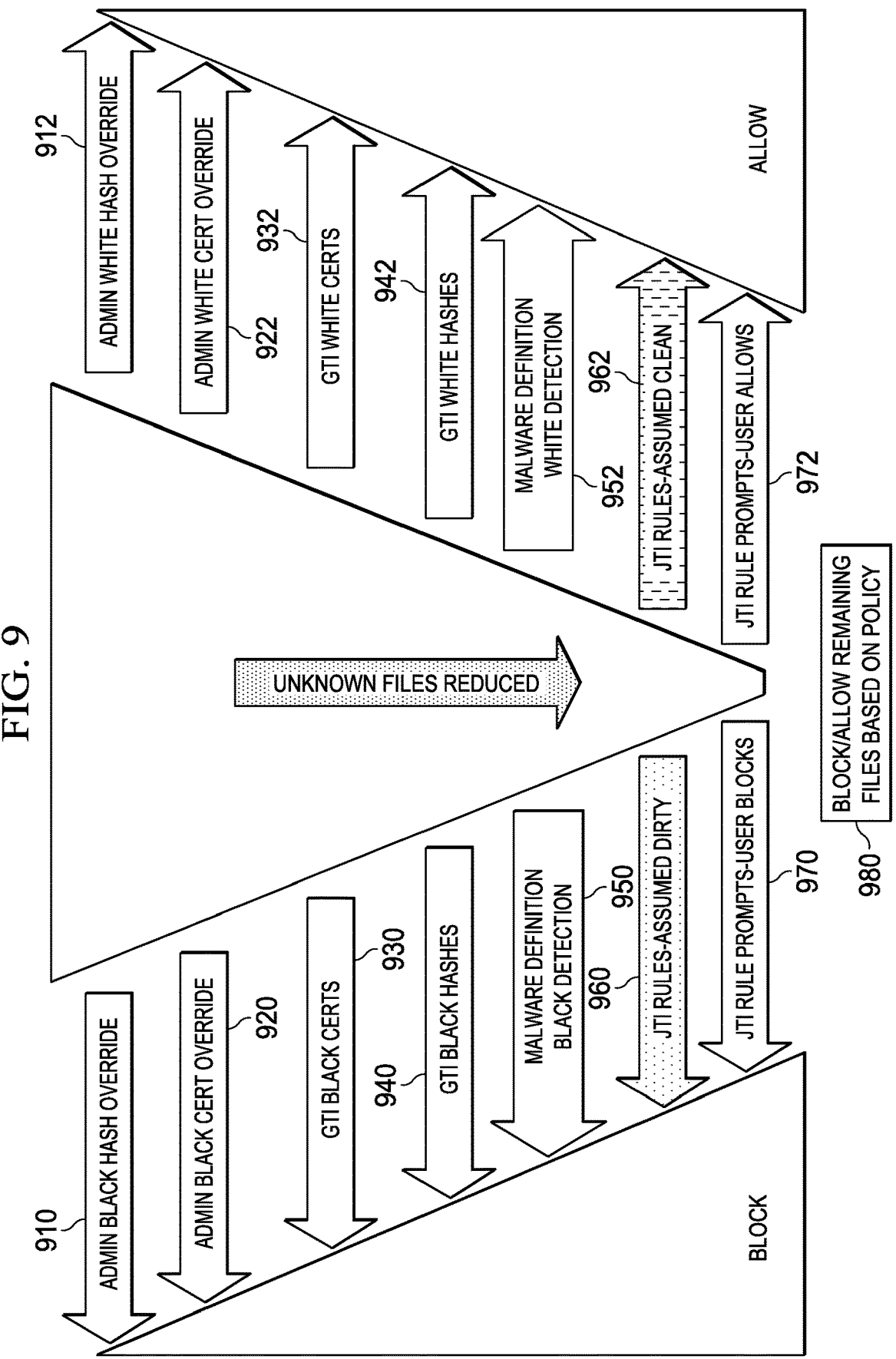
FIG. 9 is a flow diagram illustrating evaluation of an object in a hierarchical manner according to one or more examples of the present specification.

FIG. 9 is a flow diagram illustrating evaluation of an object in a hierarchical manner according to one or more examples of the present specification.

In this example, policies on the left are designated as "black," and deterministically block an object, while policies on the right are designated as "white," and deterministically allow an object. By way of non-limiting example, the policies of FIG. 9 are disclosed as a fixed hierarchy. However, this is not intended to be limiting. For example, in other embodiments, policies may be weighted, or serviced in a round-robin fashion. Furthermore, in embodiments where a hierarchy is used, this particular hierarchy is not required.

In block 910, an administrator, which may be either or both of a human operator or a device with administrative credentials, may assign a "black" override to the object, which may be identified by a hash. In block 912, the administrator may provide a "white" override to an object identified by a hash.

In block 920, an administrator may assign a black override to an object identified by a certificate. In block 922, an administrator may assign a white overwrite to an object identified by a certificate.

In block 930, threat intelligence service 180 may assign a black status based on a certificate. In block 932, threat intelligence service 180 may assign an object a white status based on a certificate.

In block 940, threat intelligence service 180 may assign an object black status base on a hash. In block 942, threat intelligence service 180 may assign an object white status based on a hash.

In block 950, malware definitions may identify an object as black, while in block 952, malware definitions may identify the object as white.

In block 960, JTI rules may assume that the object is dirty. In block 962, JTI rules may assume that the object is clean.

JTI client 824 may prompt an end user, via user interface 860, to confirm executing or opening an object. If the user declines, then in block 970 the object is blocked. If the user confirms, then in block 972 the object is allowed.

In block 980, if the object has passed all the preceding filters, a decision to either block or allow the object depends on JTI policies and algorithms. This may include requesting a reputation for the object.

Figure 10:
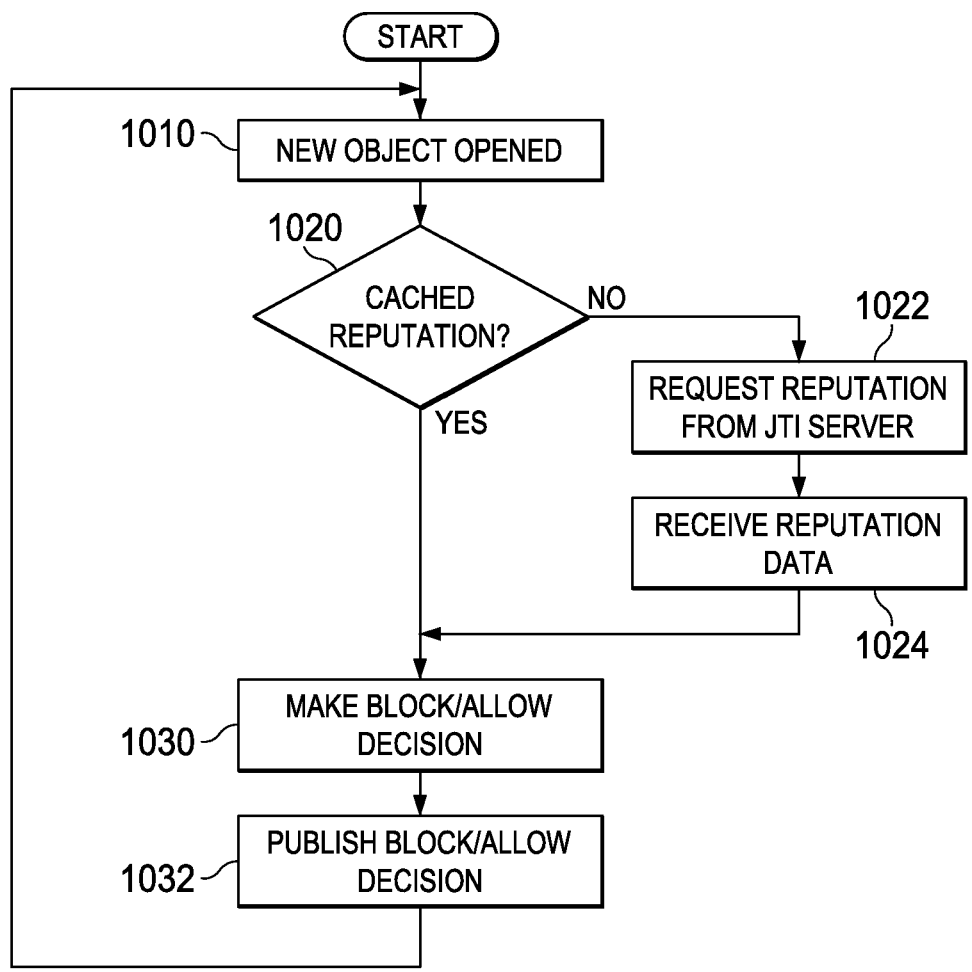
FIG. 10 is a flow diagram of a method performed by a client according to one or more examples of the present specification.

FIG. 10 is a flow diagram of a method performed by a client 120 according to one or more examples of the present specification. In block 1010, client 120 opens a new object. This may be, for example, because a user interacts with the object, or because an automated process interacts with the object. In block 1020, client 120 checks to see if the object has a cache reputation in its local reputation database. If the object has an existing reputation, then in block 1030, client 120 may make a decision to either block or allow the object. In some examples, client 120 may publish the block or allow decision over DXL ESB 130. This allows other DXL network objects that have subscribed to such updates to receive and integrate the decision. In block 1022, if there is no cache reputation, then client 120 may request a reputation from JTI server 150. In block 1024, client 120 may receive reputation data from JTI server 150, whereupon control passes to block 130. As shown by the looping arrow back to 1010, this process may be repeated for each new object.

Figure 10A:
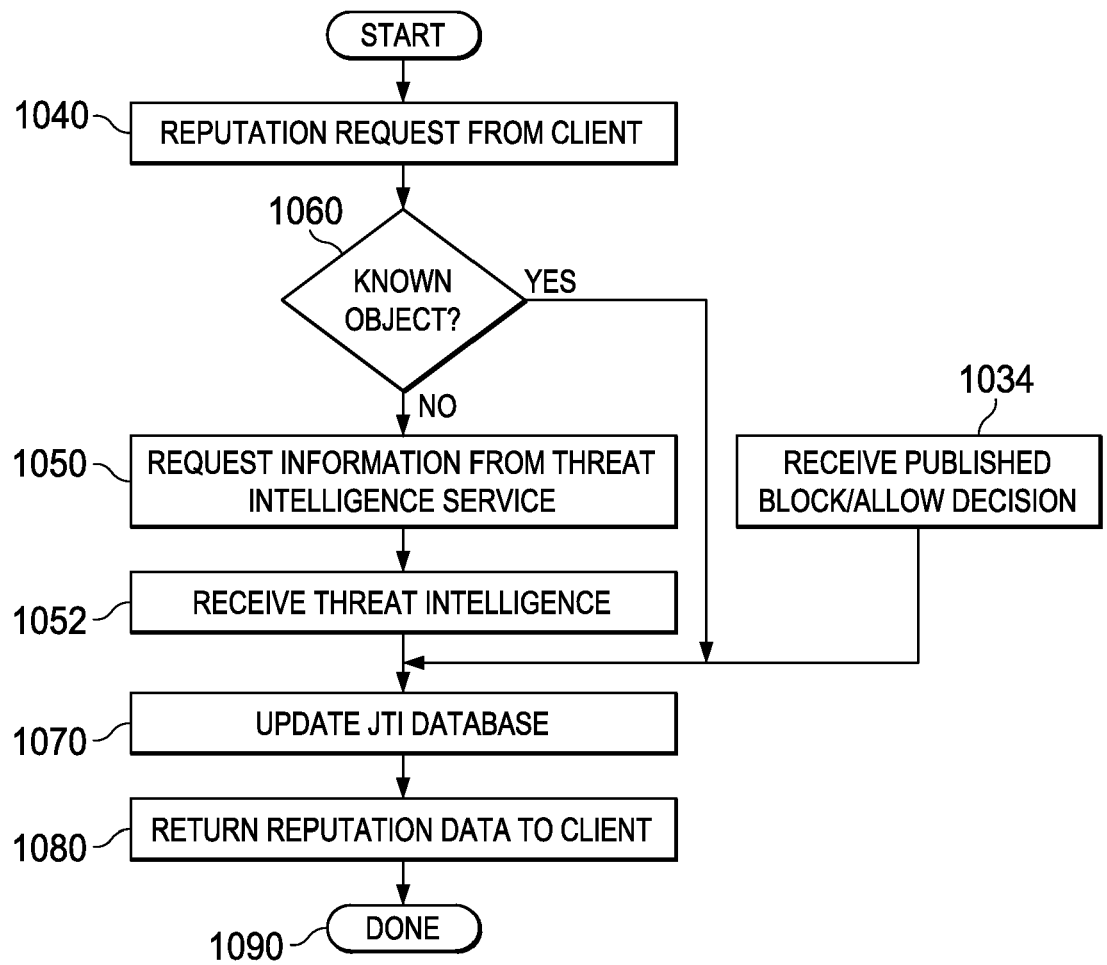
FIG. 10A is a flow diagram of a method performed by a JTI server in connection with the method of FIG. 10 according to one or more example embodiments of the present specification.

FIG. 10A is a flow diagram of a method performed by JTI server 150 in connection with the method of FIG. 10 according to one or more example embodiments of the present specification. In block 1040, JTI server 150 receives a reputation request from client 120. In block 1060, JTI server 150 may query its local database to find whether the object is already known. If the object is known, then in block 1070, JTI server 150 may update its local threat intelligence database. This may include, for example, noting the circumstances of the request from client 120. In block 1080, JTI server 150 may return the reputation data to client 120. In block 1090, the method is complete.

Returning to block 1060, if the object is not known, then in block 1050 JTI server 150 may request information from the threat intelligence service 180. In block 1052, JTI server 150 receives threat intelligence data from threat intelligence service 180, and in block 1070 updates its local JTI database with the received intelligence. Again in block 1080, the intelligence is returned to client 120, and in block 1090 the process is done.

Block 1034 represents an alternate entry point into the method. At block 1034, a JTI server 150 receives a published decision, for example a decision published by client 120 according to a method of FIG. 10. Depending on the network configuration, JTI server 150 may subscribe to published block/allow decisions, and in block 1070 may use a publish decision to update its local database. In this case, control passes directly from block 1080 to block 1090.

Figure 11:
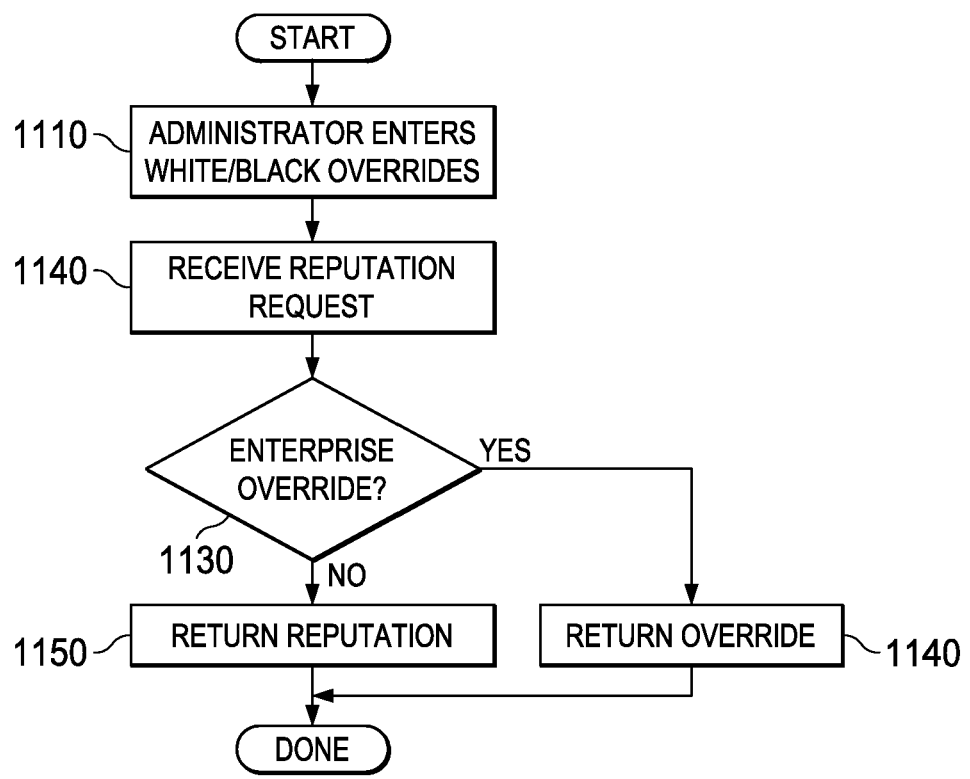
FIG. 11 is a flow diagram of a method of a JTI server servicing a reputation request according to one or more examples of the present specification.

FIG. 11 is a flow diagram of a method of a JTI server 150 servicing a reputation request according to one or more examples of the present specification. In some embodiments, the method of FIG. 11 may be performed in connection with block 1080 of FIG. 10A. In block 1110, an administrator may enter white or black overrides, for example as disclosed in connection with FIG. 9. Block 1040 corresponds to block 1040 of FIG. 10A, in which the JTI server 150 receives a reputation request from client 120. In block 1130, JTI server 150 checks to see whether the administrator has entered an override, such as an enterprise-wide override. In particular, an override may remove the decision of whether to allow or block the object. Instead, the override may deterministically allow or block the object. Thus, in block 1140, JTI server 150 returns the override to client 120. In block 1130, if there is no enterprise override, then in block 1150, JTI server 150 returns the reputation for client 120 to act on.

Figure 12:
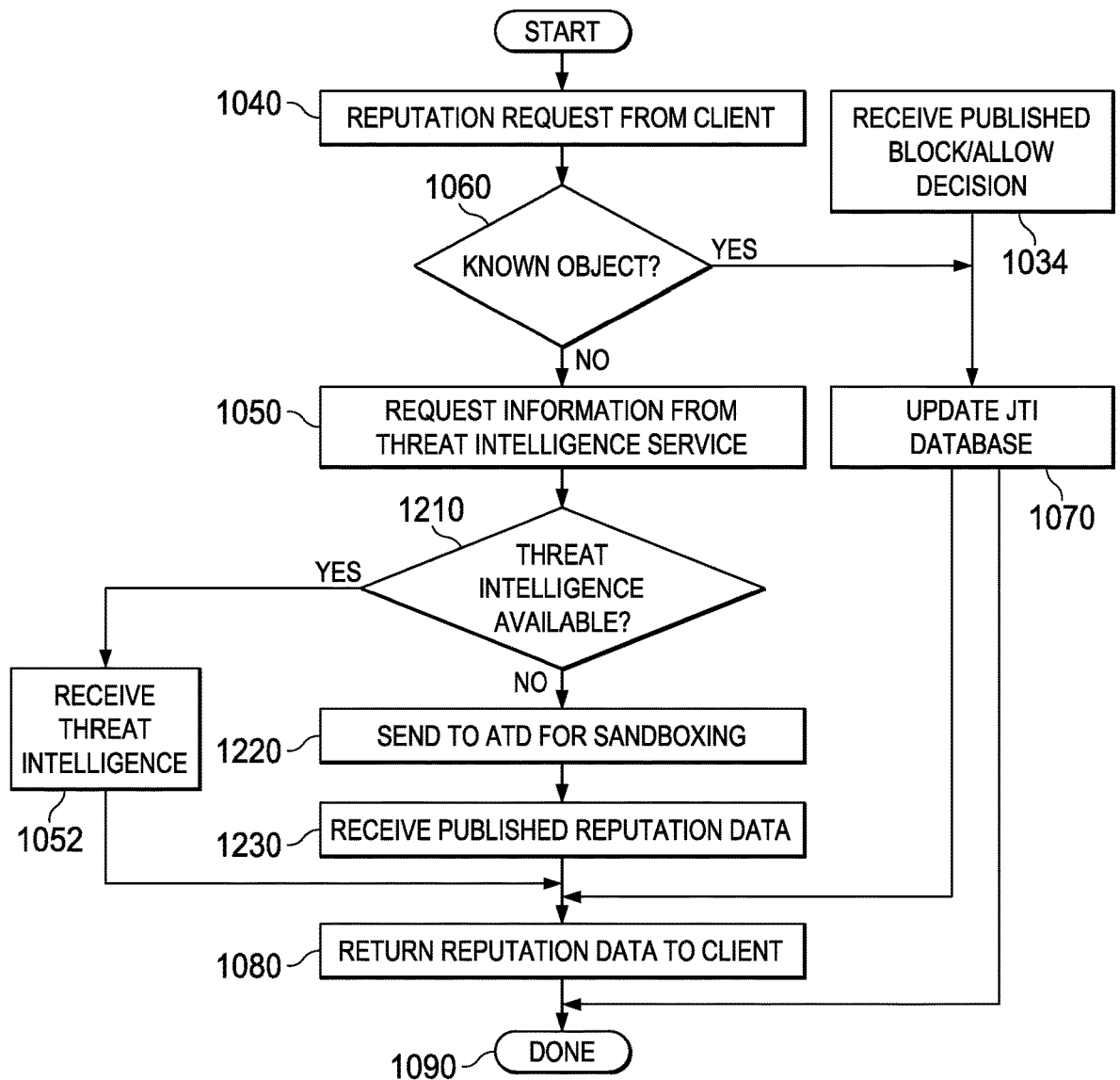
FIG. 12 is a flow diagram of an enhancement to the method of FIG. 10A according to one or more examples of the present specification.

FIG. 12 is a flow diagram of an enhancement to the method of FIG. 10A according to one or more examples of the present specification. Blocks in FIG. 12 with the numbering identical to the blocks in FIG. 10A may be identical with the functions of blocks disclosed in FIG. 10A.

New block 1210 queries whether threat intelligence is available from threat intelligence service 180. If threat intelligence is available, then in block 1052, JTI server 150 receives the threat intelligence as with FIG. 10A. In block 1220, if no threat intelligence is available, then JTI server 150 may send the object to ATD 370 for analysis. Rather than respond directly to the request, ATD 370 may publish reputation data for the object once it has completed its analysis. In block 1230, JTI server 150 may subscribe to published reputation data messages, and thus may receive the DXL message published by ATD 370. The remainder of the method may be unchanged.

In some embodiments, a publish-subscribe framework is not optimized for one-to-one interactions, such as a single client 120 connecting to a single service. For example, some embodiments support "wildcard" syntax for addressing messages, in particular, request-response interactions may not be recognized as first-level messages. This means that implementing request-response messaging is up to an individual embodiment. Furthermore, some prior-art publish-subscribe middleware solutions do not provide the ability to determine whether a service is actively connected to a message broker and listening for requests. Thus, a client 120, for example, may send a request and never receive a response. To adapt to this possibility, client 120 may designate an arbitrary "time out" value, after which a request is deemed to have failed if no response is received.

In an example, there is disclosed a hierarchy of message types that operate on top of a publish-subscribe architecture. Message types may include, by way of non-limiting example, request/response-derived error-response types and an event type. The event type may be equivalent to the default publish-subscribe middleware message type.

The publish-subscribe framework may be enhanced to detect request-response interactions and optimize their delivery. For example, if a service is not available on DXL ESB 130, DXL broker 110 may return a "service unavailable" message. This may be sent immediately via an "error" response. This may eliminate the need for a client to set a timeout or use other similar error detection.

Requests may be directed immediately and delivered to services without requiring expensive processing of message delivery searches, such as wildcards. Routing related information may be embedded in messages to streamline the operation of request-response message interactions. For example, the target "broker" in a "network of brokers" scenario is included and leveraged by DXL broker 110 to ensure messages are delivered using an optimal path through a plurality of DXL brokers 160.

Figure 13:
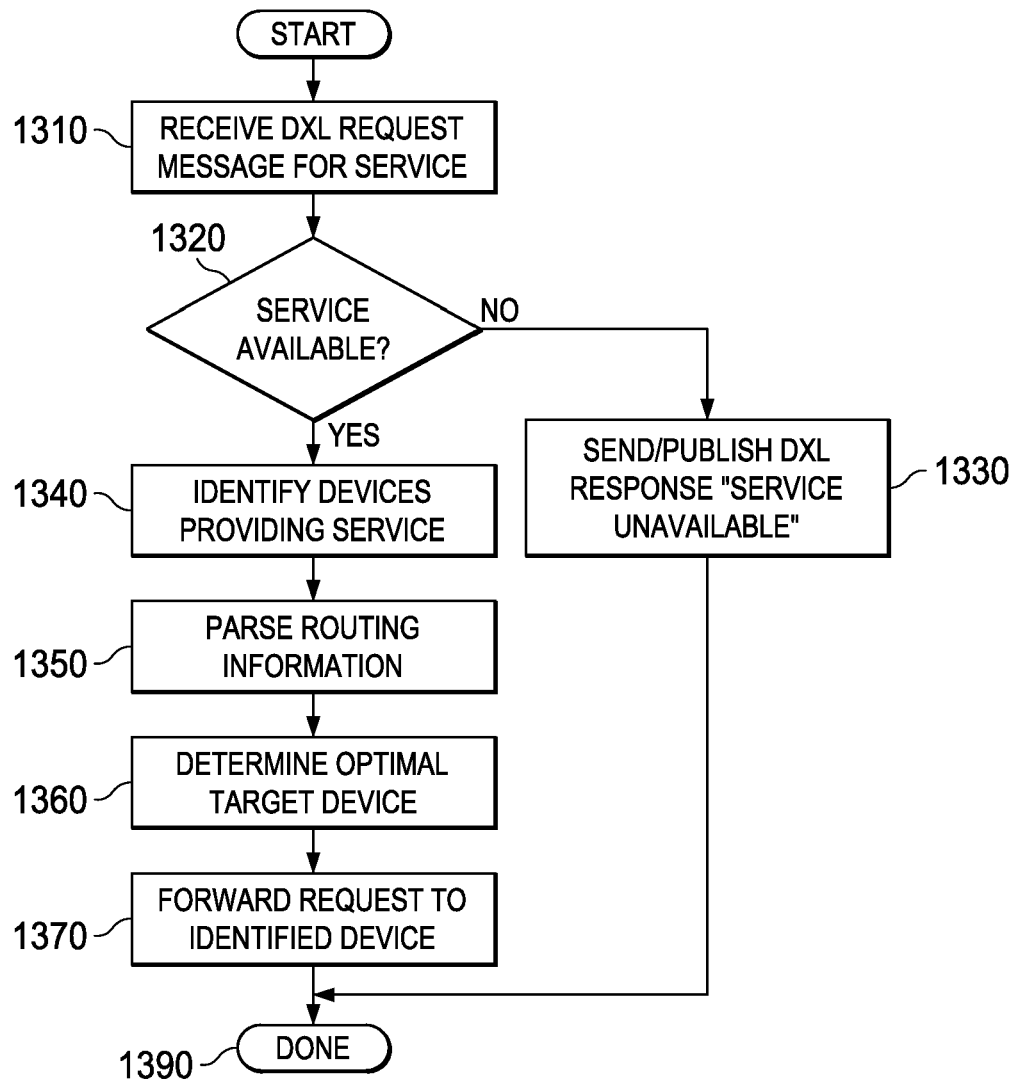
FIG. 13 is a flow diagram of an example method of registering a service on a DXL enterprise service bus (ESB) according to one or more examples of the present specification.

FIG. 13 is a flow diagram of an example method of registering a service on DXL ESB 130. In an example, a client 120, for example, may send a DXL request message over DXL ESB. In block 1310, DXL broker 110 receives the request message. In block 1320, DXL broker 110 checks to see whether the service is available on DXL ESB 130. This may include querying a local database to determine whether the requested service has been registered on DXL ESB 130.

The service may be registered, for example, if a domain master 160 configured to provide the service has registered on DXL ESB 130.

In block 1330, if the service is not available, then domain master 110 may either send a DXL response message to client 120, indicating that the service is unavailable, or publish a DXL notification indicating that the service is unavailable. In block 1340, if the service is available, then DXL broker 110 may identify devices, such as DXL domain masters 160, providing the service. In block 1350, DXL broker 110 may parse routing information to DXL domain masters 160 providing the service. In block 1360, DXL broker 110 may determine the optimal target device, for example by identifying the DXL domain master 160 in closest physical proximity to client 120, or the device with the lowest latency between client 120 and DXL domain master 160. In some embodiments, determining an optimal target device may comprise looking up a device previously identified as optimal, which may occur offline or be performed by a different device. In block 1370, DXL broker 110 may forward to client 120 the device identified in block 1360. In block 1390, the process is complete.

Figure 13A:
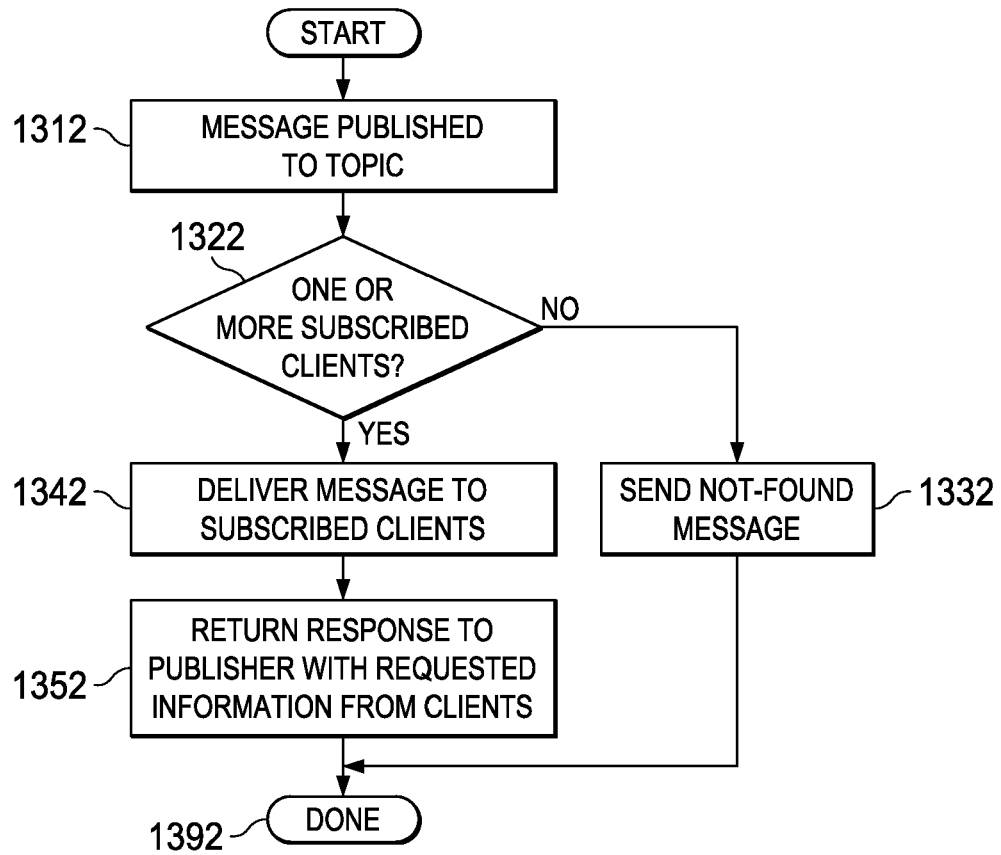
FIG. 13A is a block diagram of a method performed by a DXL broker according to one or more examples of the present specification.

FIG. 13A is a block diagram of a method performed by a DXL broker 110, disclosing with more particularity certain aspects of the method of FIG. 13. In this case, in block 1312, an endpoint such as a client 120 may publish a DXL message on DXL ESB 130 directed to a particular topic. In block 1322, DXL broker 110 checks to see whether any domain masters 160 have subscribed to the message. In block 1332, if no domain masters 160 have subscribed to the message, then DXL broker 110 concludes that the service is not available on DXL ESB 130. In block 1332, DXL broker 110 may return a "not found" message. In block 1392, the method is done.

In response to block 1322, if DXL broker 110 finds that there are endpoints that have subscribed to the message topic, then in block 1342, DXL broker 110 delivers the message to subscribed endpoints. In block 1352, DXL broker 110 receives requested information from the subscribed endpoints and responds to the publisher with requested information. In block 1392, the method is done.

Figure 14:
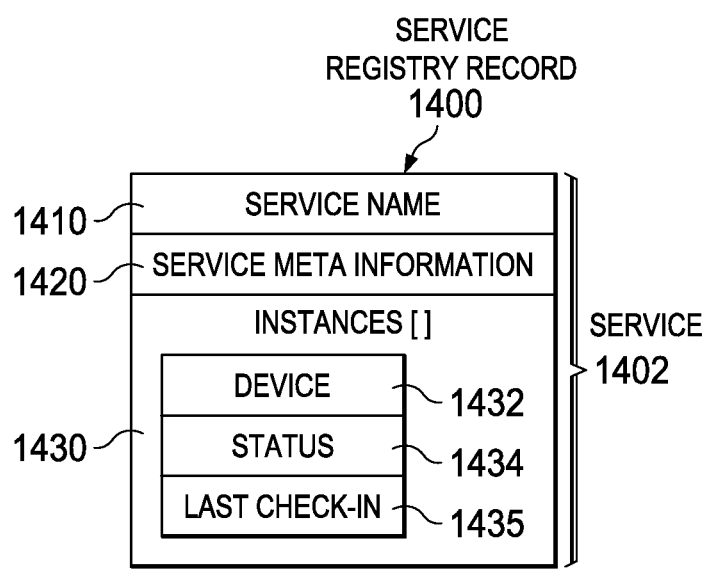
FIG. 14 is a block diagram of a service registry record according to one or more examples of the present specification.

In connection with the methods described above, it may be useful for DXL broker 110 to maintain a service registry, enumerating which services are available, and how many instances of each service are available. FIG. 14 is a block diagram of a service registry record 1400 according to one or more examples of the present specification. A service registry record 1400 may be maintained, for example, by DXL broker 110. Service registry record 1400 tracks an example service 1402, including a plurality of instances thereof. In this example, service registry record 1400 includes the service name 1410, service meta-information 1420, and an array of more instances 1430. Instances of array 1430 may include, for each instance, information such as a device identifier 1432, a status 1434, and a last check in time 1435. Device identifier 1432 may identify, for example, a domain master 160 providing the service. The identifier may be an IP address, a MAC address, an identifier string, or any other suitable identifier. Status 1432 may indicate whether the service is presently available on the device, and may be aware, for example, if a device enters a low power or other reduced functionality state. Last check in 1435 may indicate when domain master 160 last interacted with DXL broker 110, indicating that it is still online. DXL broker 110 may be configured to "ping" or otherwise locate domain master 160 if enough time passes. This may allow DXL broker 110 to continuously ensure that domain master 160 is online and providing service 1402.

Figure 15:
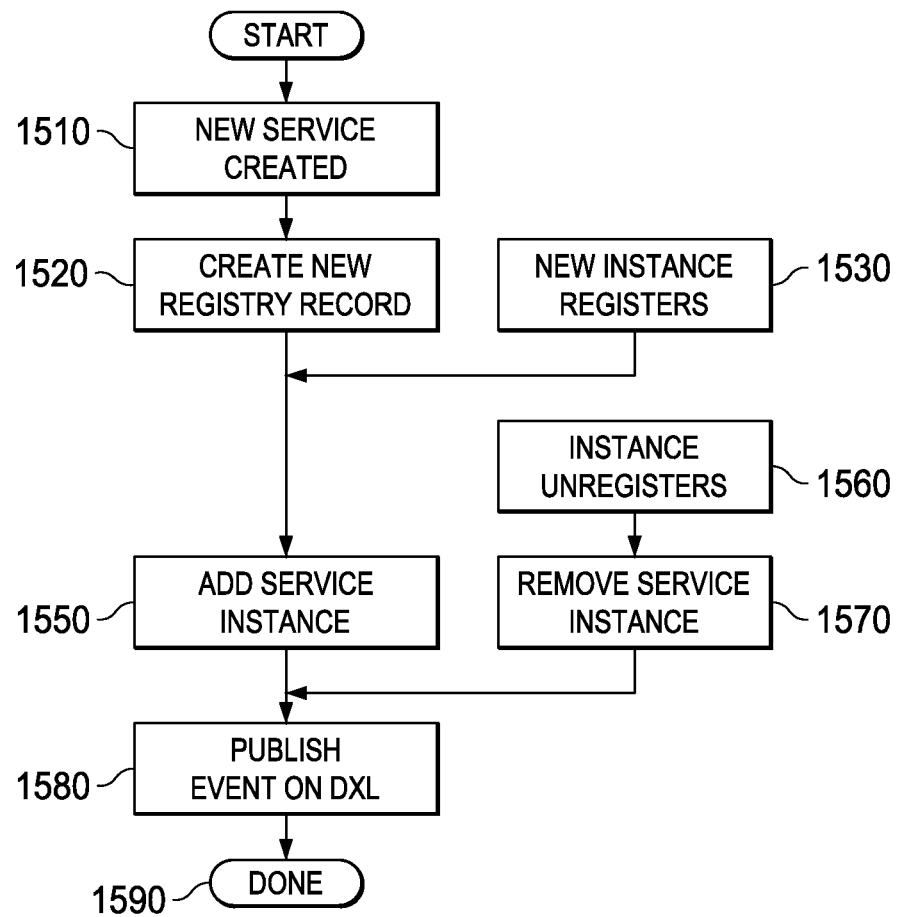
FIG. 15 is a flowchart of an example method by a DXL broker in connection with maintaining a service registry according to one or more examples of the present specification.

FIG. 15 is a flowchart of an example method performed by DXL broker 110 in connection with maintaining a service registry. In block 1510, a new service is created. For example, a domain master 160 may join DXL ESB 130 and may publish the availability of a previously unregistered service. In block 1520, DXL broker 110 creates a new registry record for the new service. As an alternate entry point to the method, and to block 1530, a domain master 160 may register with DXL ESB 130 and publish the availability of a new instance of an existing service. In block 1550, whether this is the first instance of a new service, or a new instance of an existing service, an instance of that service is added to service registry record 1400.

As yet another entry point to the method, in block 1520 an instance of service 1402 may be unregistered on DXL ESB 130. This may include, for example, a domain master 160 publishing its unavailability. In another example, this may include DXL broker 110 attempting to ping a domain master 160 that has been inactive for too long and not receiving a response. In block 1570, the instance of service 1402 is removed from service registry record 1400.

In block 1580, DXL broker 110 publishes the event, including adding a service instance or removing a service instance. In block 1590, the method is done.

Figure 16:
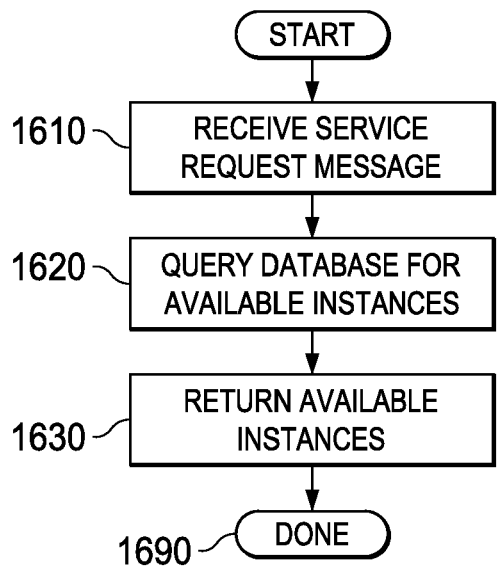
FIG. 16 is a flow diagram of a method performed by a DXL broker upon receiving a DXL request from a client according to one or more examples of the present specification.

FIG. 16 is a flow diagram of a method performed by DXL broker 110 upon receiving a DXL request from a client 120, for example. In one embodiment, this method may form part of block 1320 of FIG. 13, in which DXL broker 110 determines whether the services are available. In block 1610, DXL broker 110 receives a service request message. In block 1620, DXL broker 110 queries its local database, including checking service registry record 1400, to determine whether at least one instance of the requested service is available. In block 1630, DXL broker 110 may return to client 121 or more available instances of service 1402.

Figure 17:
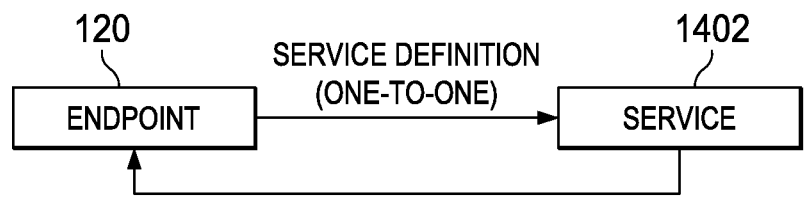
FIGS. 17 and 17A illustrate an example service architecture according to one or more examples of the present specification.
Figure 17A:
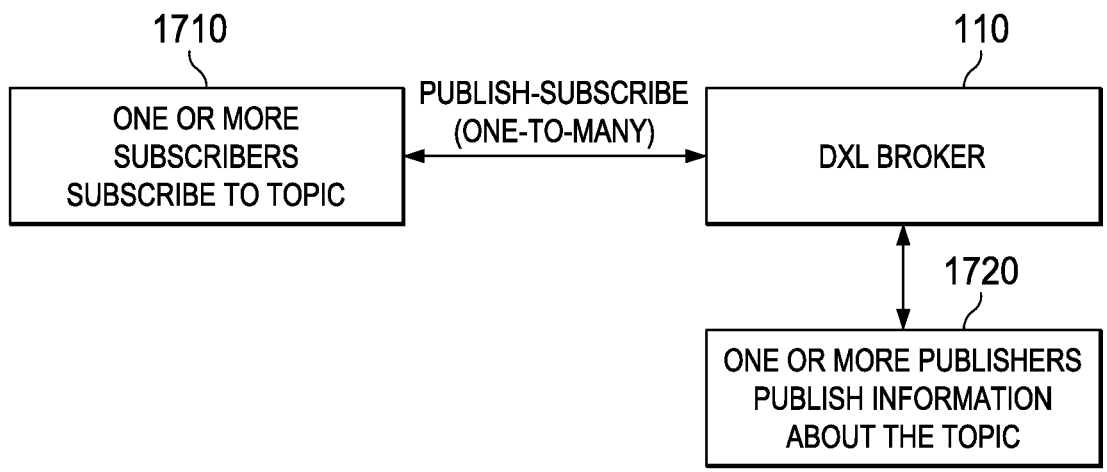

FIGS. 17 and 17A illustrate an example service architecture. In FIG. 17, an endpoint 120 may form a one-to-one connection with service 1402, for example via domain master 160. In FIG. 17A, in block 1710, one or more subscribers, including clients 120, may subscribe to a topic. DXL broker 110 may act as an intermediary between clients 120 and domain masters 160. In block 1720, one or more publishers may publish information about the topic on DXL ESB 130. This provides a one-to-many publishing framework.

Figure 18:
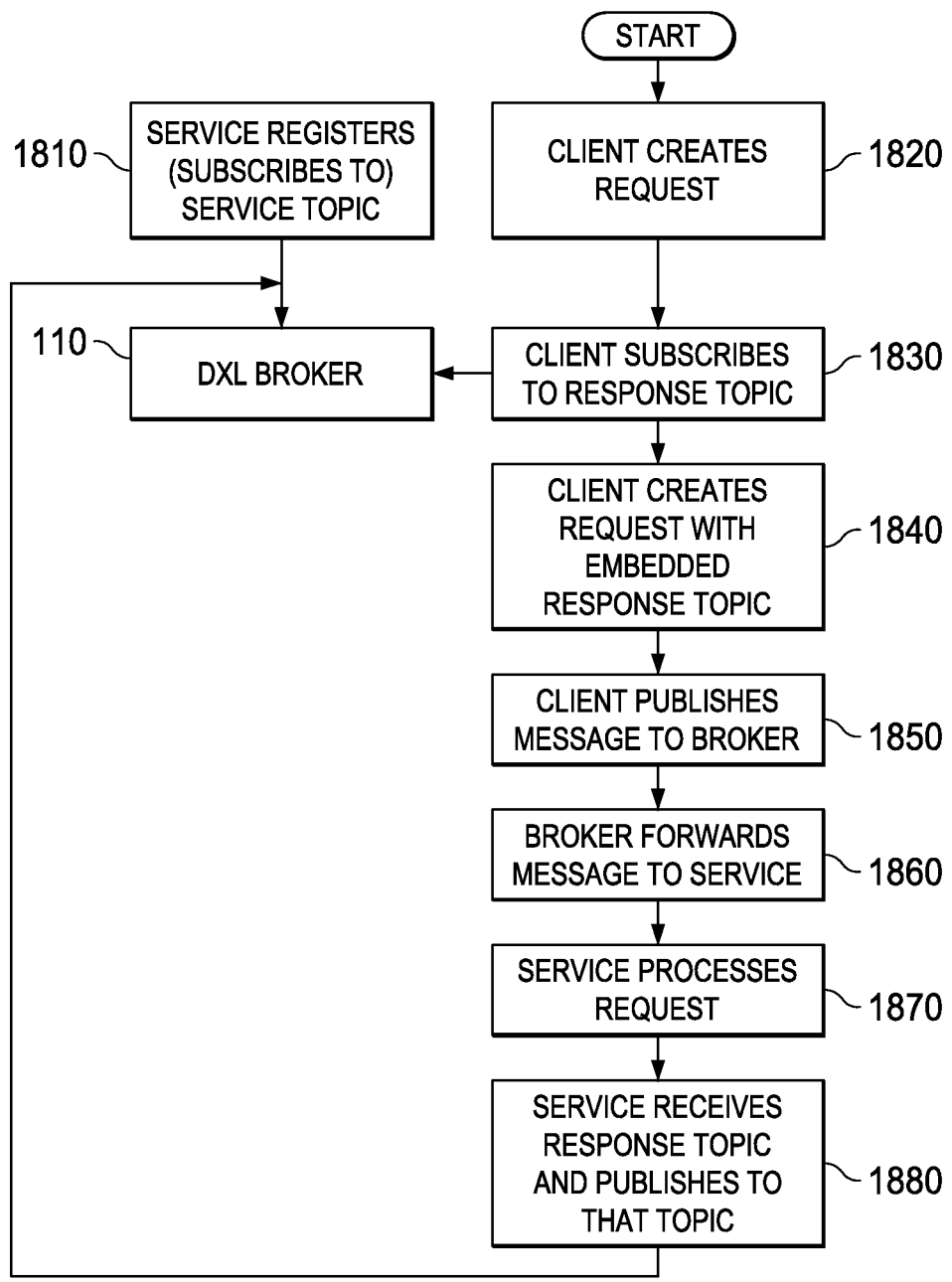
FIG. 18 is a block diagram of network interactions according to one or more examples of the present specification.

FIG. 18 is a block diagram of network interactions according to one or more examples of the present specification. In block 1810, a service registers with a service topic. This may include, for example, a domain master 160 joining DXL ESB 130 and publishing its availability to process service requests. The message may be published to DXL broker 110. In block 1820, a client 120 creates a service request. In block 1830, the client subscribes to response topics by sending a DXL request message to DXL broker 110. In block 1840, client 120 may create a request with an embedded response topic. In block 1850, client 120 may publish the request to DXL broker 110. In block 1860, broker 110 may forward the request to service 1402, for example by forwarding the message to a suitable domain master 160. In block 1870, domain master 160 processes the service request. In block 1880, domain master 160 receives the response topic and publishes to that topic by sending a message to DXL broker 110.

Figure 19:
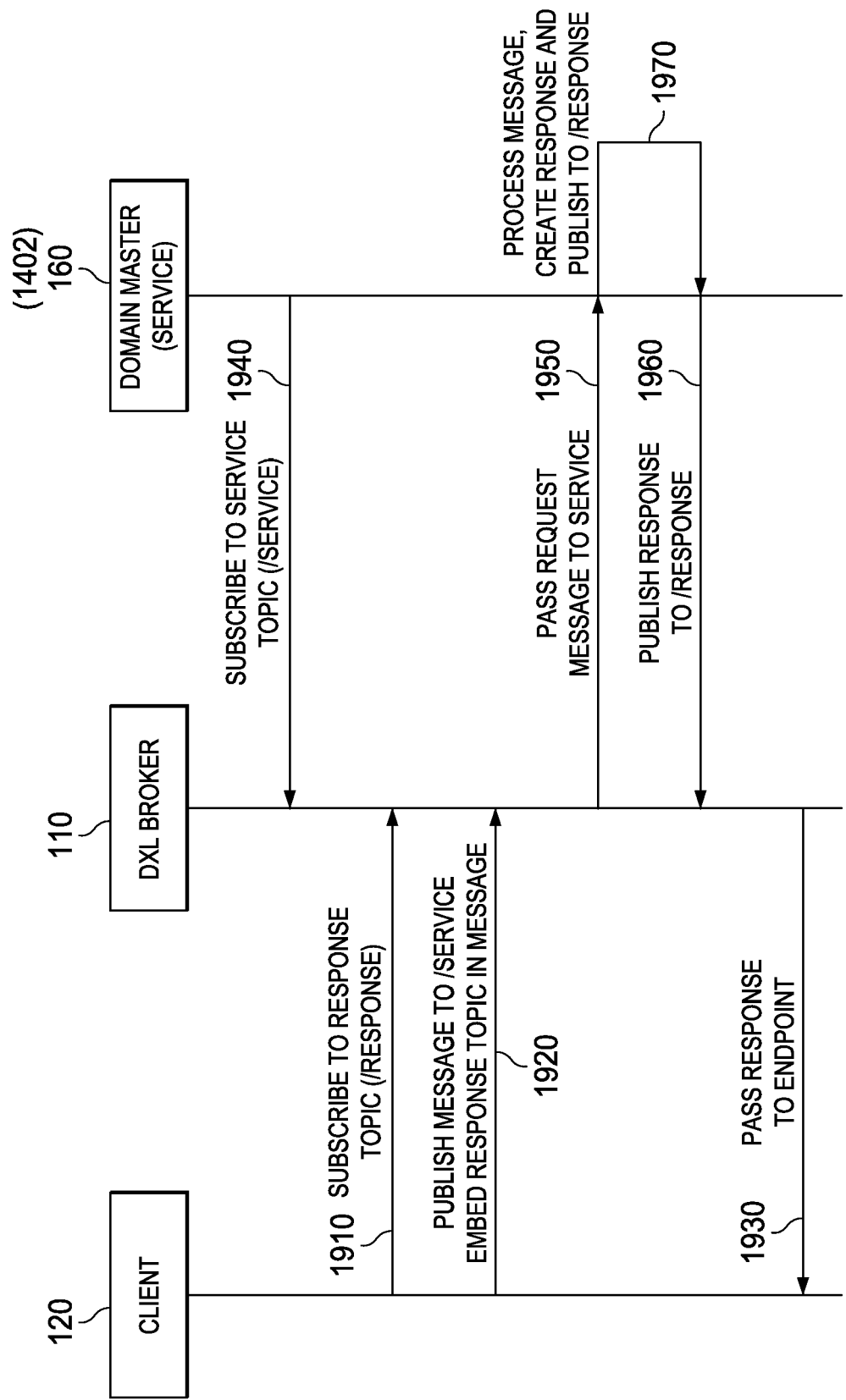
FIG. 19 is a signal flow diagram disclosing passage of signals between a client, a broker, and a domain master providing a service according to one or more examples of the present specification.

FIG. 19 is a signal flow diagram disclosing passage of signals between client 120, broker 110, and domain master 160 providing service 1402. Signal 1910 is a "subscribe to response topic" message that client 120 passes to DXL broker 110. Signal 1940 is a "subscribe to service topic" message that domain master 160 sends to broker 110. Signal 1920 is a "publish message to service" message, including an embedded response topic, which client 120 passes to DXL broker 110. Signal 1950 is a signal in which DXL broker 110 passes the request message to domain master 160. According to signal 1970, domain master 160 processes the message to create a response, and publishes the response. According to signal 1960, domain master 160 publishes the response message to DXL broker 110. According to signal 1930, DXL broker 110 passes the response to endpoint 130.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed FIGUREs, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE EMBODIMENT IMPLEMENTATIONS

There is disclosed herein as example 1, one or more non-transitory computer-readable mediums having stored thereon executable instructions for providing a data exchange layer (DXL) broker, the executable instructions operable to:
  connect to an enterprise service bus;
  receive a DXL message on the enterprise service bus;
  identify the DXL message as a registration of a DXL domain master providing a service; and
  update a data repository to indicate that the service is available.

There is disclosed herein as example 2, the non-transitory computer-readable medium of example 1, wherein the executable instructions are further operable to identify a plurality of domain masters providing the service.

There is disclosed herein as example 3, the non-transitory computer-readable medium of example 2, wherein the executable instructions are further operable to receive from an endpoint a DXL request message requesting the service.

There is disclosed herein as example 4, the non-transitory computer-readable medium of example 2, wherein the executable instructions are further operable to determine an optimal one of the plurality of domain masters providing the service.

There is disclosed herein as example 5, the non-transitory computer-readable medium of example 4, wherein the instructions operable to determine an optimal one of the plurality of domain masters providing the service comprise instructions operable to parse routing information to the plurality of domain masters and determine a nearest domain master to the endpoint.

There is disclosed herein as example 6, the non-transitory computer-readable medium of example 5, wherein the executable instructions are further operable to forward the request to the nearest domain master.

There is disclosed herein as example 7, the non-transitory computer-readable medium of example 1, wherein the executable instructions are further operable to:
  receive a DXL request message on the enterprise service bus; and
  publish a DXL notification indicating that the service is available.

There is disclosed herein as example 8, the non-transitory computer-readable medium of example 1, wherein the executable instructions are further operable to:
  receive a DXL request message on the enterprise service bus; and
  provide a DXL response message indicating that the service is available.

There is disclosed herein as example 9, the non-transitory computer-readable medium of example 1, wherein the executable instructions are further operable to:
  receive a DXL request message directed to the service;
  determine that no DXL domain master is available to provide the service; and
  provide a DXL response message indicating that the service is unavailable.

There is disclosed herein as example 10, the non-transitory computer-readable medium of example 1, wherein the executable instructions are further operable to:
  receive a DXL request message from a client directed to the service;
  identify a plurality of DXL domain masters providing the service;
  determine an optimal one of the plurality of DXL domain masters for servicing the request; and
  forward the DXL request message to the best one of the plurality of DXL domain masters.

There is disclosed herein as example 11, a data exchange layer (DXL) broker comprising:
  a processor;
  a network interface operable to communicatively couple a processor to a DXL enterprise service bus; and
  a memory having stored thereon executable instructions operable to instruct the processor to:
    connect to an enterprise service bus;
    receive a DXL message on the enterprise service bus;
    identify the DXL message as a registration of a DXL domain master providing a service; and
    update a data repository to indicate that the service is available.

There is disclosed herein as example 12, the DXL broker of example 11, wherein the executable instructions are further operable to identify a plurality of domain masters providing the service.

There is disclosed herein as example 13, the non-transitory computer-readable medium of example 12, wherein the executable instructions are further operable to receive from an endpoint a DXL request message requesting the service.

There is disclosed herein as example 14, the DXL broker of example 12, wherein the executable instructions are further operable to determine an optimal one of the plurality of domain masters providing the service.

There is disclosed herein as example 15, the DXL broker of example 14, wherein the instructions operable to determine an optimal one of the plurality of domain masters providing the service comprise instructions operable to parse routing information to the plurality of domain masters and determine a nearest domain master to the endpoint.

There is disclosed herein as example 16, the DXL broker of example 15, wherein the executable instructions are further operable to forward the request to the nearest domain master.

There is disclosed herein as example 17, the DXL broker of example 11, wherein the executable instructions are further operable to:
  receive a DXL request message on the enterprise service bus; and
  publish a DXL notification indicating that the service is available.

There is disclosed herein as example 18, the DXL broker of example 11, wherein the executable instructions are further operable to:
  receive a DXL request message on the enterprise service bus; and
  provide a DXL response message indicating that the service is available.

There is disclosed herein as example 19, the DXL broker of example 11, where in the executable instructions are further operable to:
  receive a DXL request message directed to the service;
  determine that no DXL domain master is available to provide the service; and
  provide a DXL response message indicating that the service is unavailable.

There is disclosed herein as example 20, the DXL broker of example 11, wherein the executable instructions are further operable to:
  receive a DXL request message from a client directed to the service;
  identify a plurality of DXL domain masters providing the service;
  determine an optimal one of the plurality of DXL domain masters for servicing the request; and
  forward the DXL request message to the best one of the plurality of DXL domain masters.

There is disclosed herein as example 21, a method of providing data exchange later (DXL) broker services on an enterprise service bus, comprising:
  connecting to an enterprise service bus;
  receiving a DXL message on the enterprise service bus;
  identifying the DXL message as a registration of a DXL domain master providing a service; and updating a data repository to indicate that the service is available.

There is disclosed herein as example 2, the method of example 21, further comprising:
receiving a DXL request message from a client directed to the service;
identifying a plurality of DXL domain masters providing the service;
determining an optimal one of the plurality of DXL domain masters for servicing the request; and
forwarding the DXL request message to the best one of the plurality of DXL domain masters.

What is claimed is:

1. One or more non-transitory computer-readable mediums having stored thereon executable instructions for providing a data exchange layer (DXL) broker, the executable instructions operable to:
enumerate a plurality of DXL endpoints connected to the DXL broker, for which the DXL broker is to provide DXL communication services, and discover one or more endpoint properties for the plurality of DXL endpoints, wherein the DXL endpoints include at least one domain master and at least one client;
provide a DXL bus controller configured to provide a DXL fabric on an enterprise service bus (ESB), wherein the DXL fabric is configured to provide one-to-one device-to-device topic-based communication on a two-layer publish-subscribe fabric, wherein a first layer is an internet protocol (IP) layer, and a second layer is a lightweight messaging protocol of the ESB;
receive a DXL registration message from a domain master providing a service;
update a data repository to indicate that the service is available;
receive a DXL request message from an endpoint directed to the service;
identify a plurality of domain masters that provide the service;
determine an optimal one of the plurality of domain masters for servicing the DXL request message; and
forward the DXL request message to the optimal one of the plurality of domain masters.

2. The one or more non-transitory computer-readable mediums of claim 1, wherein the instructions operable to determine an optimal one of the plurality of domain masters providing the service comprise instructions operable to parse routing information to the plurality of domain masters and determine a nearest domain master to the endpoint.

3. The one or more non-transitory computer-readable mediums of claim 2, wherein the executable instructions are further operable to forward the DXL request message to the nearest domain master.

4. The one or more non-transitory computer-readable mediums of claim 1, wherein the executable instructions are further operable to:
receive a DXL request message on the ESB; and
publish a DXL notification indicating that the service is available.

5. The one or more non-transitory computer-readable mediums of claim 1, wherein the executable instructions are further operable to:
receive a DXL request message on the ESB; and
provide a DXL response message indicating that the service is available.

6. The one or more non-transitory computer-readable mediums of claim 1, wherein the executable instructions are further operable to:
receive a DXL request message directed to the service;
determine that no domain master is available to provide the service; and
provide a DXL response message indicating that the service is unavailable.

7. The one or more non-transitory computer-readable mediums of claim 1, wherein the plurality of domain masters are DXL domain masters.

8. The one or more non-transitory computer-readable mediums of claim 1, wherein the endpoint is a DXL client.

9. A data exchange layer (DXL) broker, comprising:
a processor;
a DXL bus controller configured to provide a DXL fabric on an enterprise service bus (ESB), wherein the DXL fabric is configured to provide one-to-one device-to-device topic-based communication on a two-layer publish-subscribe fabric, wherein a first layer is an internet protocol (IP) layer, and a second layer is a lightweight messaging protocol of the ESB;
a network interface operable to communicatively couple the DXL broker to the DXL; and
a memory having stored thereon executable instructions operable to instruct the processor to:
enumerate a plurality of DXL endpoints connected to the DXL broker, for which the DXL broker is to provide DXL communication services, and discover one or more endpoint properties for the plurality of DXL endpoints, wherein the DXL endpoints include at least one domain master and at least one client;
receive a DXL registration message from a domain master providing a service;
update a data repository to indicate that the service is available;
receive a DXL request message from an endpoint directed to the service;
identify a plurality of domain masters providing the service;
determine an optimal one of the plurality of domain masters for servicing the DXL request message; and
forward the DXL request message to the optimal one of the plurality of domain masters.

10. The DXL broker of claim 9, wherein the instructions operable to determine an optimal one of the plurality of domain masters providing the service comprise instructions operable to parse routing information to the plurality of domain masters and determine a nearest domain master to the endpoint.

11. The DXL broker of claim 10, wherein the executable instructions are further operable to forward the DXL request message to the nearest domain master.

12. The DXL broker of claim 9, wherein the executable instructions are further operable to:
receive a DXL request message on the ESB; and
publish a DXL notification indicating that the service is available.

13. The DXL broker of claim 9, wherein the executable instructions are further operable to:
receive a DXL request message on the ESB; and
provide a DXL response message indicating that the service is available.

14. The DXL broker of claim 9, wherein the executable instructions are further operable to:
receive a DXL request message directed to the service;
determine that no domain master is available to provide the service; and
provide a DXL response message indicating that the service is unavailable.

15. The DXL broker of claim 9, wherein the plurality of domain masters are DXL domain masters.

16. The DXL broker of claim 9, wherein the endpoint is a DXL client.

17. A method of providing data exchange layer (DXL) broker services, comprising:
- enumerating a plurality of DXL endpoints connected to a DXL broker, for which the DXL broker is to provide DXL communication services, and discover one or more endpoint properties for the plurality of DXL endpoints, wherein the DXL endpoints include at least one domain master and at least one client;
- providing a DXL bus controller configured to provide a DXL fabric on an enterprise service bus (ESB), wherein the DXL fabric is configured to provide one-to-one device-to-device topic-based communication on a two-layer publish-subscribe fabric, wherein a first layer is an internet protocol (IP) layer, and a second layer is a lightweight messaging protocol of the ESB;
- receiving a DXL registration message from a domain master providing a service;
- updating a data repository to indicate that the service is available;
- receiving a DXL request message from an endpoint directed to the service;
- identifying a plurality of domain masters providing the service;
- determining an optimal one of the plurality of domain masters for servicing the DXL request message; and
- forwarding the DXL request message to the optimal one of the plurality of domain masters.

18. The method of claim 17, further comprising:
- receiving a DXL request message on the ESB; and
- publishing a DXL notification indicating that the service is available.

19. The method of claim 17, further comprising:
- receiving a DXL request message on the ESB; and
- providing a DXL response message indicating that the service is available.

20. The method of claim 17, further comprising:
- receiving a DXL request message directed to the service;
- determining that no domain master is available to provide the service; and
- providing a DXL response message indicating that the service is unavailable.

21. The method of claim 17, wherein the plurality of domain masters are DXL domain masters.

22. The method of claim 17, wherein the endpoint is a DXL client.

* * * * *